US011874916B2

(12) United States Patent
Pettit et al.

(10) Patent No.: US 11,874,916 B2
(45) Date of Patent: *Jan. 16, 2024

(54) USER DEVICE AUTHENTICATION GATEWAY MODULE

(71) Applicant: Kandji, Inc., San Diego, CA (US)

(72) Inventors: Adam Pettit, San Diego, CA (US); Wesley Pettit, San Diego, CA (US); Mark Daughters, San Diego, CA (US); Brandon Modesitt, Encinitas, CA (US); Nicholas McDonald, San Diego, CA (US)

(73) Assignee: Kandji, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/931,927

(22) Filed: Sep. 14, 2022

(65) Prior Publication Data
US 2023/0137086 A1 May 4, 2023

Related U.S. Application Data

(63) Continuation of application No. 17/453,219, filed on Nov. 2, 2021, now Pat. No. 11,461,459.

(51) Int. Cl.
*G06F 21/45* (2013.01)
*H04L 1/08* (2006.01)
(Continued)

(52) U.S. Cl.
CPC .............. *G06F 21/45* (2013.01); *G06F 21/31* (2013.01); *H04L 1/08* (2013.01); *H04L 63/0884* (2013.01)

(58) Field of Classification Search
CPC . G06F 21/45; G06F 21/31; H04L 1/08; H04L 63/0884
(Continued)

(56) References Cited

U.S. PATENT DOCUMENTS 6,772,221 B1 8/2004 Ratcliff et al.
7,136,858 B2 11/2006 Malik et al.
(Continued)

FOREIGN PATENT DOCUMENTS

WO 2013096758 A1 6/2013

OTHER PUBLICATIONS

Chifor et al., 2018 IEEE, "A Flexible Authorization Mechanism for Enterprise Networks Using Smart-phone Devices", pp. 437-440 (Year: 2018).*
(Continued)

*Primary Examiner* — Khalil Naghdali
(74) *Attorney, Agent, or Firm* — MLO, a professional corp.

(57) ABSTRACT

A method involves receiving authentication module configuration data at a user device from a remote management platform. User credentials are received at the authentication module of the user device using a graphical user interface. The user credentials are transmitted to a remote identity provider service. Upon receiving a response indicating that the user credentials are authenticated by the remote identity provider service, the user credentials are transmitted to an operating system authentication module at the user device. Upon receiving a response indicating that the user credentials are not authenticated by the operating system authentication module, previously-stored user credentials are retrieved from an encrypted credential database at the user device. The user credentials are stored at an operating system credential database using the previously-stored user credentials. The user credentials are retransmitted to the operating system authentication module to authenticate the user at the user device.

20 Claims, 14 Drawing Sheets

(51) Int. Cl.
*G06F 21/31* (2013.01)
*H04L 9/40* (2022.01)

(58) Field of Classification Search
USPC .......................................................... 726/6
See application file for complete search history.

(56) References Cited

U.S. PATENT DOCUMENTS

| | | | |
|---|---|---|---|
| 7,249,187 | B2 | 7/2007 | Sobel et al. |
| 8,473,938 | B1 | 6/2013 | Feeser |
| 9,218,178 | B2 | 12/2015 | Young et al. |
| 9,288,117 | B1 | 3/2016 | Angrish et al. |
| 9,350,681 | B1 | 5/2016 | Kitagawa et al. |
| 9,727,326 | B2 | 8/2017 | Ciudad et al. |
| 9,948,617 | B2 | 4/2018 | Wysocki et al. |
| 10,147,039 | B1 | 12/2018 | Hayward et al. |
| 10,708,125 | B1 | 7/2020 | Chen |
| 10,719,332 | B1 | 7/2020 | Dwivedi et al. |
| 10,944,654 | B2 | 3/2021 | Rimar et al. |
| 11,244,034 | B1* | 2/2022 | Nagappan ............. G06F 21/316 |
| 11,461,459 | B1 | 10/2022 | Pettit et al. |
| 2003/0220945 | A1 | 11/2003 | Malik et al. |
| 2004/0103310 | A1 | 5/2004 | Sobel et al. |
| 2006/0179476 | A1 | 8/2006 | Challener et al. |
| 2007/0027965 | A1 | 2/2007 | Brenes et al. |
| 2007/0226791 | A1 | 9/2007 | Charbonneau |
| 2009/0059818 | A1 | 3/2009 | Pickett |
| 2009/0300742 | A1* | 12/2009 | Ahn .................... H04L 63/0807 |
| | | | 709/201 |
| 2010/0050229 | A1 | 2/2010 | Overby, Jr. |
| 2010/0174758 | A1 | 7/2010 | Radenkovic et al. |
| 2011/0249658 | A1 | 10/2011 | Wohlert et al. |
| 2012/0331524 | A1 | 12/2012 | Mower et al. |
| 2013/0014107 | A1 | 1/2013 | Kirchhofer |
| 2014/0024400 | A1 | 1/2014 | Kang et al. |
| 2014/0082693 | A1 | 3/2014 | Wackerly et al. |
| 2014/0365624 | A1 | 12/2014 | Whittemore et al. |
| 2015/0249617 | A1 | 9/2015 | Chang et al. |
| 2015/0341340 | A1 | 11/2015 | Lu et al. |
| 2016/0036667 | A1 | 2/2016 | Kripalani et al. |
| 2016/0087940 | A1 | 3/2016 | Miller et al. |
| 2016/0094531 | A1 | 3/2016 | Unnikrishnan et al. |
| 2016/0285858 | A1 | 9/2016 | Li et al. |
| 2017/0013021 | A1 | 1/2017 | Hoy et al. |
| 2017/0147928 | A1 | 5/2017 | Vijayendra et al. |
| 2017/0212782 | A1 | 7/2017 | Kurian et al. |
| 2017/0279934 | A1 | 9/2017 | Zacharias et al. |
| 2017/0364381 | A1 | 12/2017 | Suber et al. |
| 2018/0062923 | A1 | 3/2018 | Katrekar et al. |
| 2018/0165088 | A1 | 6/2018 | Bonar et al. |
| 2018/0239787 | A1 | 8/2018 | Viol et al. |
| 2018/0302385 | A1 | 10/2018 | Wysocki et al. |
| 2018/0365043 | A1 | 12/2018 | Kaufman et al. |
| 2019/0018964 | A1 | 1/2019 | Basehore et al. |
| 2019/0139056 | A1 | 5/2019 | Goldschlag et al. |
| 2019/0261179 | A1 | 8/2019 | Hu et al. |
| 2019/0278928 | A1 | 9/2019 | Rungta et al. |
| 2019/0281046 | A1 | 9/2019 | Xu et al. |
| 2020/0092294 | A1 | 3/2020 | Sharma et al. |
| 2020/0274828 | A1 | 8/2020 | Alapati et al. |
| 2021/0051204 | A1 | 2/2021 | Dettbarn et al. |
| 2021/0243085 | A1* | 8/2021 | Shrotri .................... G06F 21/57 |

OTHER PUBLICATIONS

Braun et al., "A Web Portal for CMS Grid Job Submission and Management", 2010 (Year: 2010).
Cheng et al., "A service oriented framework for construction supply chain integration", 2009 (Year: 2009).
Dipu, "Deployment of Wi-Fi Network", 2014 (Year: 2014).
Fernandez et al., "BigDataDIRAC: deploying distributed Big Data applications", 2015 (Year: 2015).
Gao et al., "Wireless Medical Sensor Networks in Emergency Response: Implementation and Pilot Results", 2008 (Year: 2008).
Grguric et al., "The SmartHabits: An Intelligent Privacy-Aware Home Care Assistance System", 2018 (Year: 2018).
Local Account Migration, Jamf Connect Administrator's Guide 2.0.0 / Account Creation, Accessed Online on Sep. 20, 2021, 5 pages, https://docs.jamf.com/jamf-connect/2.0.0/administrator-guide/Local_Account_Migration.html.
Manuja et al., "Moving Agile based projects on Cloud", 2014 (Year: 2014).
Mosyle Manager—macOS Identity Management, 2021 Mosyle Corporation, Accessed Online on Sep. 8, 2021, 5 bages, https://manager.mosyle.com/solutions/macos/identity-management.
Murray, "An Investigation of Specifications for Migrating to a Web Portal Framework for the Dissemination of Health Information within a Public Health Network", 2002 (Year: 2002).
Notice of Allowance and Fees dated Jul. 15, 2021 for U.S. Appl. No. 16/530,290.
Notice of Allowance and Fees dated Jul. 7, 2022 for U.S. Appl. No. 17/453,219.
Office Action dated Feb. 22, 2022 for U.S. Appl. No. 17/453,219.
Office Action dated Feb. 26, 2021 for U.S. Appl. No. 16/530,290.
OneLogin Desktop—Product Datasheet, OneLogin, Accessed Online on Sep. 9, 2021, 2 pages, https://www.onelogin.com/onelogin-desktop-datasheet.pdf.
Password Syncing with Jamf Connect, Jamf Connect Administrator's Guide 2.0.0 / Password Syncing, Accessed Online on Sep. 8, 2021, 4 pages, https://docs.jamf.com/jamf-connect/2.0.0/administrator-guide/Password_Syncing_with_Jamf_Connect.html.
Stoev et al., "Architectural framework for Dynamic Web-applications", 2008 (Year: 2008).
Vecchio et al., "Evaluating Grid Portal Security", 2006 (Year: 2006).
International Search Report and Written Opinion dated Jan. 31, 2023 for PCT Patent Application No. PCT/IB2022/060276.
Office Action dated Oct. 26, 2023 for U.S. Appl. No. 17/445,473.

* cited by examiner

USER DEVICE AUTHENTICATION GATEWAY MODULE

RELATED APPLICATIONS

This application is a continuation of U.S. patent application Ser. No. 17/453,219, filed Nov. 2, 2021, all of which is incorporated by reference herein for all purposes.

BACKGROUND

Security policies that govern the behavior of user devices within a network vary by different enterprises, vary within different areas of an enterprise, and can vary for different user devices. Such user devices are generally computing devices and include desktop computers, laptop computers, tablet computers, and smartphones.

Instituting different security policies in addition to ensuring compliance with those policies for each user device within an enterprise may be a difficult and costly task. Some enterprises may allocate finite IT resources to build security software and maintain it over time. However, for enterprises with different policies for different user devices, the effort and cost in developing security software can multiply with the number of policies, which further impacts the feasibility of relying on internal resources to build and maintain security software. Creating and maintaining internal software of any kind can require regular testing to ensure that it functions as intended, which would be a further strain on finite resources.

One common enterprise security policy is a requirement that a user must provide valid user credentials at a user device to be logged into that device. Policies regarding the user credentials, such as password complexity, password expiration, and associated permissions at the user devices are often specified at an organizational level. Managing user compliance with the specified user credential policies, as well as assisting users who may have forgotten their password or need to reset their password may add significant workload and help-ticket requests to an already overburdened IT department.

SUMMARY

In some embodiments, a method involves receiving, by a device agent operating at a user device, authentication module configuration data from a remote management platform, the device agent comprising an authentication gateway module. A graphical user interface is provided, by the authentication gateway module, to a user at the user device to receive user credentials, the graphical user interface being displayed in accordance with the authentication module configuration data. The user credentials are received, by the authentication gateway module, using the graphical user interface. The user credentials are transmitted, by the authentication gateway module, to a remote identity provider service. Upon receiving, by the authentication gateway module, a first authentication response from the remote identity provider service indicating that the user credentials are authenticated by the remote identity provider service, transmitting, by the authentication gateway module, the user credentials to an operating system authentication module at the user device. Upon receiving, by the authentication gateway module, a first authentication response from the operating system authentication module indicating that the user credentials are not authenticated by the operating system authentication module, first previously-stored user credentials are retrieved, by the authentication gateway module, from an encrypted credential database stored at the user device. The user credentials are stored, by the authentication gateway module, at an operating system credential database, stored at the user device, using the first previously-stored user credentials. The user credentials are re-transmitted, by the authentication gateway module, to the operating system authentication module to authenticate the user at the user device.

In some embodiments, a system includes a user device configured to receive, by a device agent operating at the user device, authentication module configuration data from a remote management platform. The device agent includes an authentication gateway module, and the user device is further configured to provide, by the authentication gateway module, a graphical user interface to a user at the user device to receive user credentials, the graphical user interface being displayed in accordance with the authentication module configuration data. The user credentials are received by the authentication gateway module using the graphical user interface. The user credentials are transmitted by the authentication gateway module to a remote identity provider service. Upon receiving a first authentication response, by the authentication gateway module, from the remote identity provider service indicating that the user credentials are authenticated by the remote identity provider service, the authentication gateway module is configured to transmit the user credentials to an operating system authentication module at the user device. Upon receiving a first authentication response, by the authentication gateway module, from the operating system authentication module indicating that the user credentials are not authenticated by the operating system authentication module, the authentication gateway module is configured to retrieve first previously-stored user credentials from an encrypted credential database stored at the user device. The user credentials are stored, by the authentication gateway module, at an operating system credential database, stored at the user device, using the first previously-stored user credentials. The user credentials are re-transmitted, by the authentication gateway module, to the operating system authentication module to authenticate the user at the user device.

DETAILED DESCRIPTION

In some embodiments, an authentication gateway module is disclosed that advantageously coordinates local user device authentication at a user device using both a remote identity provider service and an operating system (OS) authentication module of the user device in accordance with configuration parameters that are specified at a remote management platform. Such user devices include desktop computers, laptop computers, tablet computers, and smartphones, among other computing devices or compute nodes. The authentication gateway module advantageously synchronizes passwords between the OS authentication module and the remote identity provider service without requiring additional user input, thereby creating a simplified user experience and reducing help requests for an IT department. The authentication gateway module advantageously facilitates local user account creation and local user account migration and is further operable to advantageously automatically configure a group association for a newly created local user account or a migrated local user account. One technical benefit of the authentication gateway module disclosed herein is a simplified user experience during user device login, local user account creation, local user account migration, and security policy updates, thereby reducing the amount of individualized support needed by IT administrators or help desk personnel as compared to conventional user device authentication solutions.

For example, some conventional authentication solutions allow a user to be authenticated at a user device using a remote identity provider service. However, such conventional solutions require a user to enter previously used OS authentication credentials at the user device to synchronize the OS authentication credentials with credentials associated with the remote identity provider service. If the user cannot remember their previous OS authentication credentials, individualized IT administrator assistance may be needed. In many conventional solutions, the IT administrator may require physical access to the user device to remediate a forgotten password, may need to provide individualized remote attention, or may need the user to perform a complicated procedure to remediate a forgotten password.

Thus, in enterprises that frequently update user credentials associated with a remote identity provider service, prompting a user to enter previous credentials at the user device may be cumbersome to both the IT department and to the users and therefore may limit how often the enterprise updates the user credentials associated with the remote identity provider service.

Figure 1:
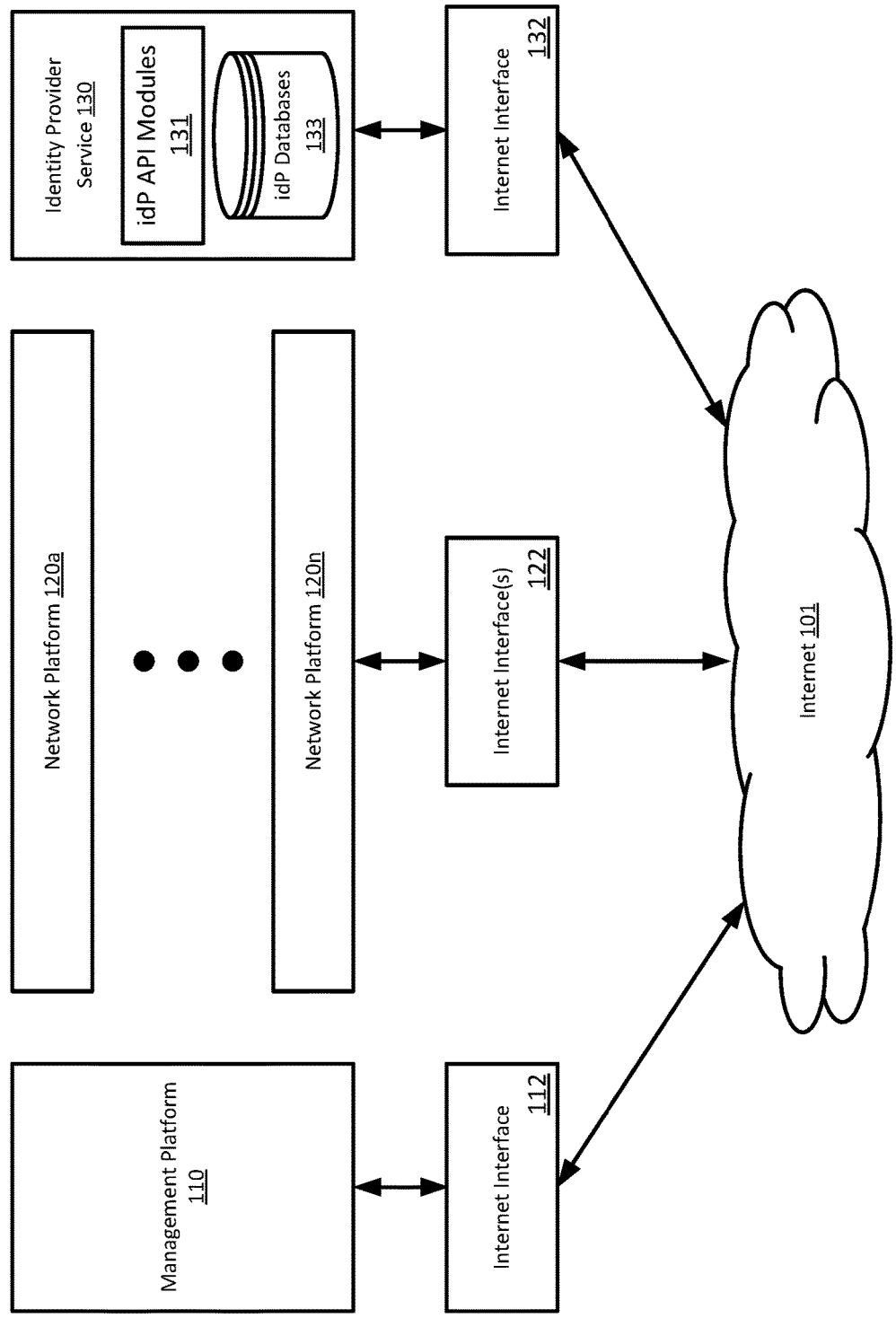
FIG. 1 shows a simplified operational environment for an authentication gateway module of a user device, in accordance with some embodiments.

FIG. 1 shows a simplified operational environment 100 for an authentication gateway module of a user device, in accordance with some embodiments. In general, the operational environment 100 includes a remote management platform 110, network platforms 120a-n, and a remote identity provider service 130. The authentication gateway module, described in detail herein, is implemented at one or more user devices (not shown) of the network platforms 120a-n. The management platform 110, and identity provider service 130 are each remote from the perspective of the network platforms 120a-n. That is, the management platform 110 and the identity provider service may be owned, located, and provided by independent organizations as compared to organizations that own the network platforms 120a-n. The network platforms 120a-n may each be associated with an independent organization or a sub-entity within an organization. The network platforms 120a-n are operable to communicate with the management platform 110 and the identity provider service 130 through the internet 101 via respective internet interfaces 122, 112, and 132.

The identity provider service 130 generally includes identity provider service (idP) application programming interface (API) modules 131 and idP databases 133. The idP API modules 131 are generally operable to receive user credentials from remote applications via the internet interface 132 and, in accordance with information stored at the idP databases 133, to transmit authentication responses to the same, or different, remote applications indicating whether the user credentials are authenticated. Authenticated user credentials indicate that the user is "who they say they are" and are thereby authorized to access a resource such as a user device, an application, a data object, etc. In some cases, the authentication response may include a data object such as a token or a ticket that includes further information or conditionals related to the user authentication (e.g., an authentication time limit).

Figure 14:
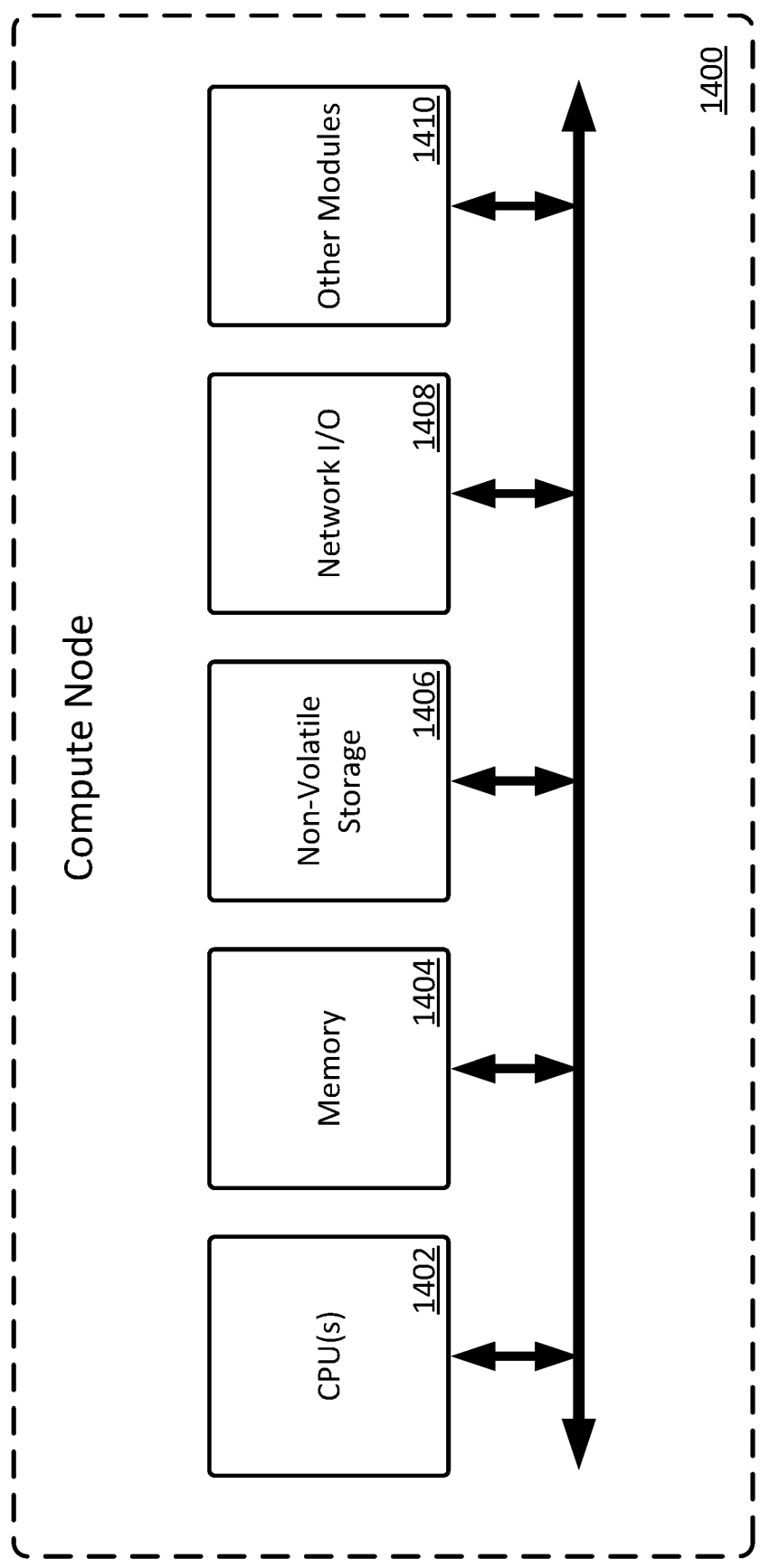
FIG. 14 shows a simplified hardware implementation of a compute node, in accordance with some embodiments.

A simplified example hardware implementation of a compute node to implement all or a portion of the management platform 110, all or a portion of components of the network platforms 120a-n, and/or all or a portion of the identity provider service 130, is shown in FIG. 14. Details of the management platform 110 and the network platforms 120a-n follow.

Figure 2:
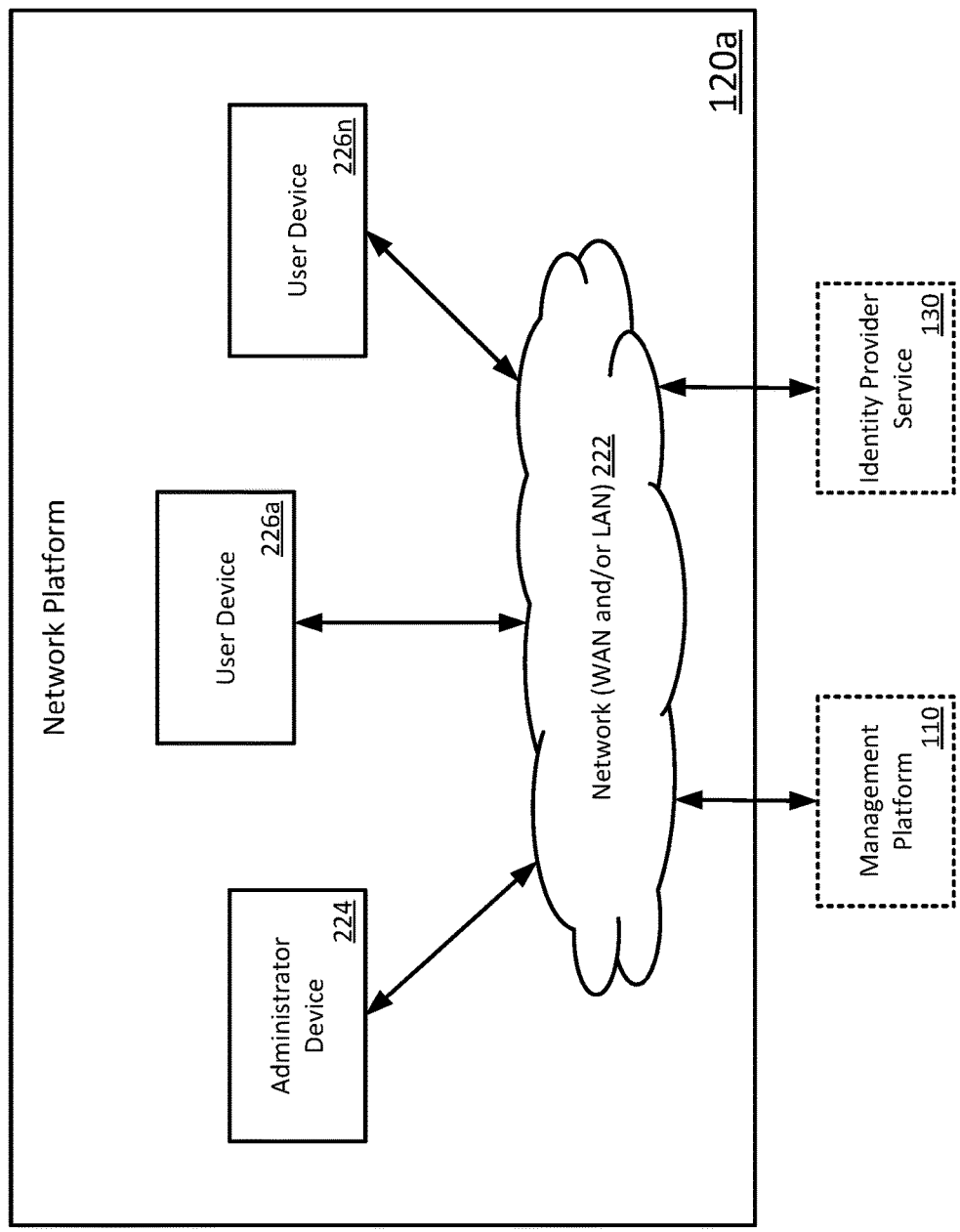
FIG. 2 shows a simplified example of a network platform of the operational environment in FIG. 1, in accordance with some embodiments.

FIG. 2 shows a simplified example of the network platform 120a shown in FIG. 1, in accordance with some embodiments. In general, the network platform 120a includes an administrator device 224 that communicates with the management platform 110 and the identity provider service 130 via a wide area network (WAN) of a network 222 and communicates with user devices 226a-n via the WAN or a local area network (LAN) of the network 222. The network 222 may represent an intranet of an enterprise and/or the internet. The user devices 226a-n are also operable to communicate with the management platform 110 and the identity provider service 130 via the WAN of the network 222.

The administrator device 224 generally includes a computing device operated by an administrator of the network platform 120a. Functions of the administrator device 224 include using a web-based portal to select sets of configurations at the management platform 110 which are selectively applied to groups of the user devices 226a-n within the network platform 120a. Functions of the administrator device 224 may also include using a web-based portal to review reports generated by the management platform 110 detailing a configuration compliance status at each user device 226a-n to which those configurations apply.

To elaborate, the management platform 110 advantageously generates and stores configurations which may be applied to one or more of the user devices 226a-n. Configurations may be defined by preset parameters or adjustable variable parameters that control behaviors of the user devices 226a-n. For each configuration, a description of the behavior controlled by the parameters of that configuration may be stored for later viewing and optional selection by an operator of the administrator device 224.

In some embodiments, after different configurations are determined and stored, the management platform 110 generates an interface (e.g., a web-portal) that allows different administrator devices of different network platforms to determine (e.g., select) one or more sets of configurations that will respectively be applied to one or more different groups of user devices (also referred to herein as "computing devices"). The interface is provided (i.e., served) by the management platform 110 to the administrator device 224 of the network platform 120a.

Using the interface, an operator of the administrator device 224 selects a set of configurations. Selection of a particular configuration may be carried out by way of providing an input that identifies a desired use of the configuration—e.g., selecting an option to activate the configuration, such as keeping a toggle at an "on" state or moving a toggle to an "on" state. Deselection of a particular configuration may be carried out by way of providing an input that identifies use of the configuration is not desired— e.g., selecting an option to deactivate the configuration, such as keeping a toggle at an "off" state or moving a toggle to an "off" state. While selecting configurations to include in a set, certain selected configurations may require initialization of, or allow for, adjustment to variables of those configurations (e.g., lengths of time associated with functionality of the configurations, or other options affecting how configurations run on user devices).

In some embodiments, the operator of the administrator device 224 is presented, via a web-portal, with a predefined collection of configurations and is able to select particular configurations by keeping a toggle at an "on" state for those configurations of the predefined collection and moving a toggle to an "off" state for non-selected configurations of the predefined collection. Predefined collections may come in different forms, including collections of suggested configurations for complying with different compliance security standards, and the operator can select a particular collection for a particular standard from among other collections for other standards via a display presented by the web-portal.

In other embodiments, the operator of the administrator device 224 selects a previously created set of configurations and then edits that set graphically using the web-portal by adding or removing configurations from the set, or by modifying values of adjustable variables for particular configurations before saving an updated version that set that includes the modifications.

Because of the predefined collection of configurations provided by the management platform 110, and because of the simplified graphical interface provided by the web-portal by the management platform 110, an administrator may advantageously configure a user device to include remote identity authentication service authentication much more easily than if the administrator were using conventional authentication solutions which may require the administrator to write scripts or perform low-level configurations.

Figure 3:
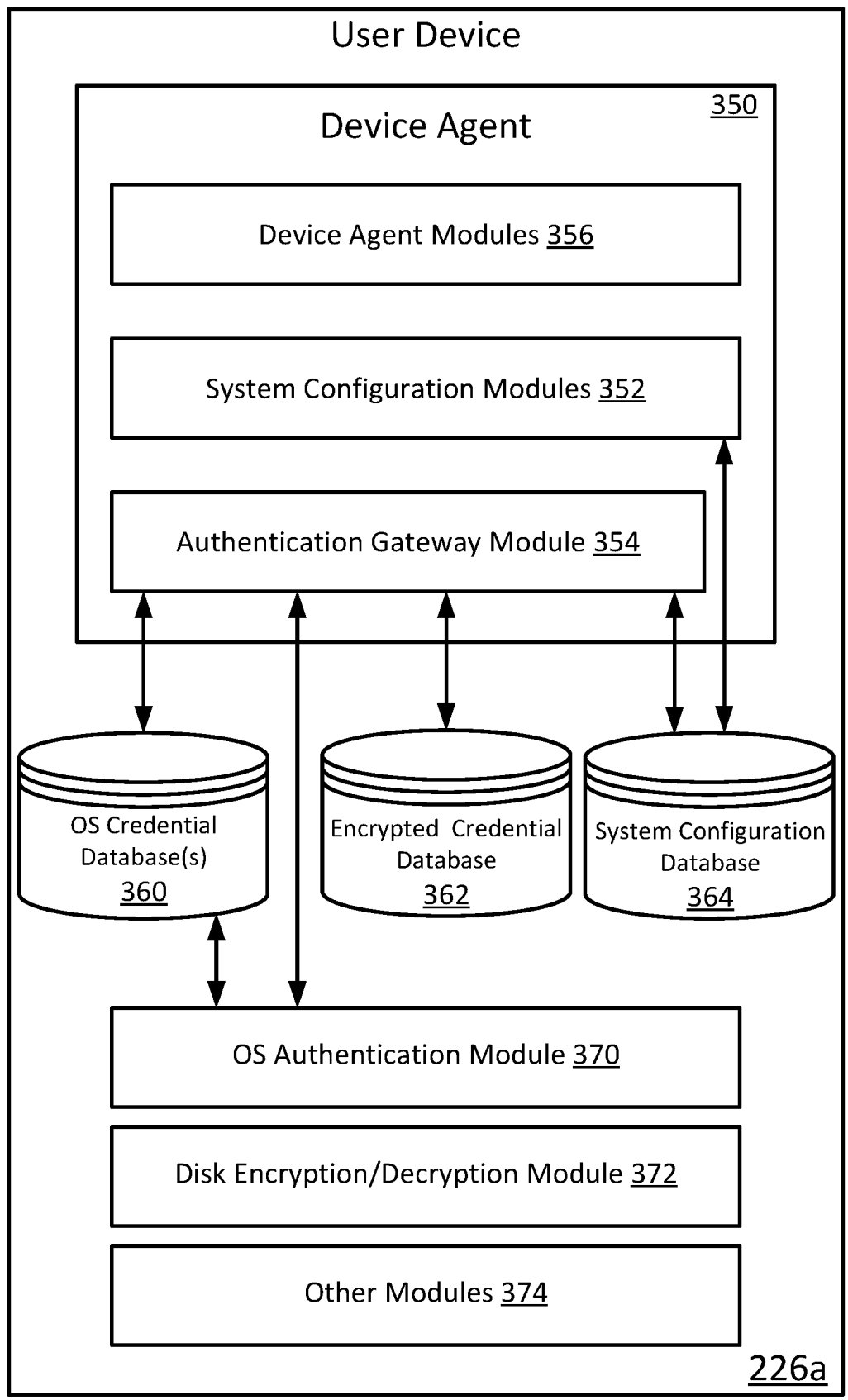
FIG. 3 shows a simplified example of a user device of the network platform shown in FIG. 2, in accordance with some embodiments.

FIG. 3 shows a simplified example of a user device 226a of the network platform 120a shown in FIG. 2, in accordance with some embodiments. The user device 226a is a computing device such as a server, a desktop computer, a laptop computer, a tablet computer, or a smartphone, among others. In general, the user device 226a includes a device agent 350 that is associated with the management platform 110, an operating system (OS) credential database 360, an encrypted credential database 362, a system configuration database 364, an operating system (OS) authentication module 370, a disk encryption/decryption module 372, and other modules 374. The other modules 374 may include, among others, modules that are related to the operating system installed and running at the user device 226a, as well as modules that are related to software application that are installed at the user device 226a. In general, the device agent 350 includes system configuration modules 352, an authentication gateway module 354, and other device agent modules 356. In some embodiments, the device agent 350 is installed at the user device 226a by the management platform 110. In other embodiments, the device agent 350 is installed, or is caused to be installed, on the user device 226a as part of a factory setup, pre-shipping setup, or re-seller setup process of the user device 226a. The device agent 350 is operable to receive and implement configurations, as described above, from the management platform 110.

The OS credential database 360, the OS authentication module 370, the disk encryption/decryption module 372, and the other modules 374 are each managed and used by an operating system of the user device 226a (i.e., they are "part of" the operating system). In contrast, the encrypted credential database 362 and the system configuration database 364 are associated with, and are for use by, the device agent 350, rather than directly by the operating system of the user device 226a.

The authentication gateway module 354 and the OS authentication module 370 are both operable to communicate with the OS credential database 360 (e.g., a "keychain" or "keystore"). The authentication gateway module 354 is also operable to communicate with the OS authentication module 370. The encrypted credential database 362 is configured to exclusively communicate with the authentication gateway module 354 or other modules of the device agent 350. That is, other modules of the user device 226a outside of the device agent 350 are not permitted (e.g., by file-level permission settings and/or by cryptography) to read data from or write data to the encrypted credential database 362.

The system configuration modules 352 are operable to configure, update, and remediate operating system, user account, and user settings of the user device 226a in accordance with configurations specified by the administrator device 224 using a web-portal of the management platform 110. The system configuration module 352 is additionally operable to configure the authentication gateway module 354 in accordance with configurations specified by the administrator device 224 using the web-portal of the management platform 110. In some embodiments, the authentication gateway module 354 is included as part of the device agent 350 for each user device but is only enabled at a particular user device upon receiving, by the device agent 350, authentication module configuration data at that user device and is subsequently configured by the system configuration modules 352. Similarly, upon being de-configured by the system configuration module 352 at the user device 226a, the authentication gateway module 354 is disabled at the user device 226a.

A simplified example hardware implementation of a computing node to implement of all or a portion of the user device 226a is shown in FIG. 14.

Figure 4:
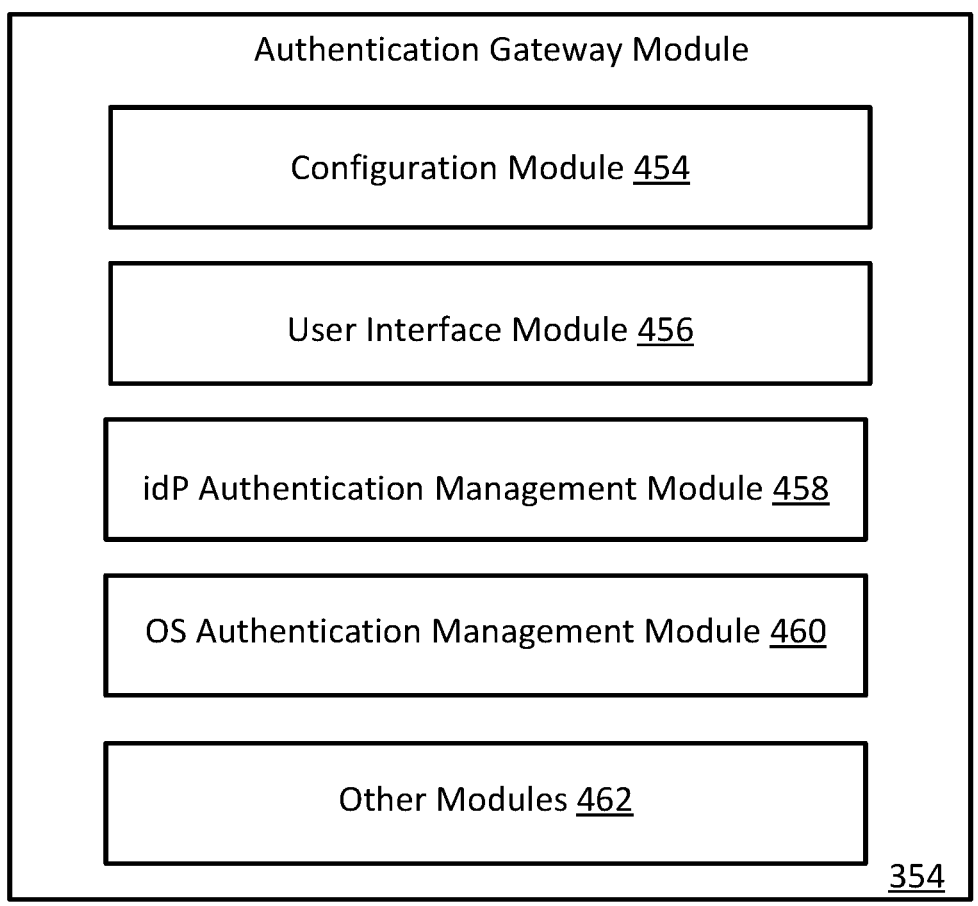
FIG. 4 shows a simplified example of an authentication gateway module of a device agent of the user device shown in FIG. 3, in accordance with some embodiments.

FIG. 4 shows a simplified example of the authentication gateway module 354 of the user device 226a shown in FIG. 3, in accordance with some embodiments. The authentication gateway module 354 generally includes a configuration module 454, a user interface module 456, an identity provider service (idP) authentication management module 458, an operating system (OS) authentication management module 460, and other modules 462. The configuration module 454 is operable to receive authentication module configuration data from the system configuration module 352 of the device agent 350 or directly from the management platform 110. The user interface module 456 is operable to provide a graphical user interface ("user interface") at a display of the user device 226a to receive user credentials and other information, as well as to provide information to the user. The idP authentication management module 458 is operable to send authentication requests (e.g., user credentials and other information) to the identity provider service 130 and to receive authentication responses and other information therefrom. Similarly, the OS authentication management module 460 is operable to send authentication requests (e.g., user credentials and other information) to the OS authentication module 370 of the user device 226a and to receive authentication responses and other information therefrom. The idP authentication management module 458 and/or the OS authentication management module 460 are operable to communicate (e.g., read data from and write data to) the OS credential database 360, the encrypted credential database 362, and the system configuration database 364 of the user device 226a. In some embodiments, modules of the authentication gateway module 354 must provide valid credentials to a module of the user device 226a to be authorized to communicate with the OS credential database 360.

Figure 5:
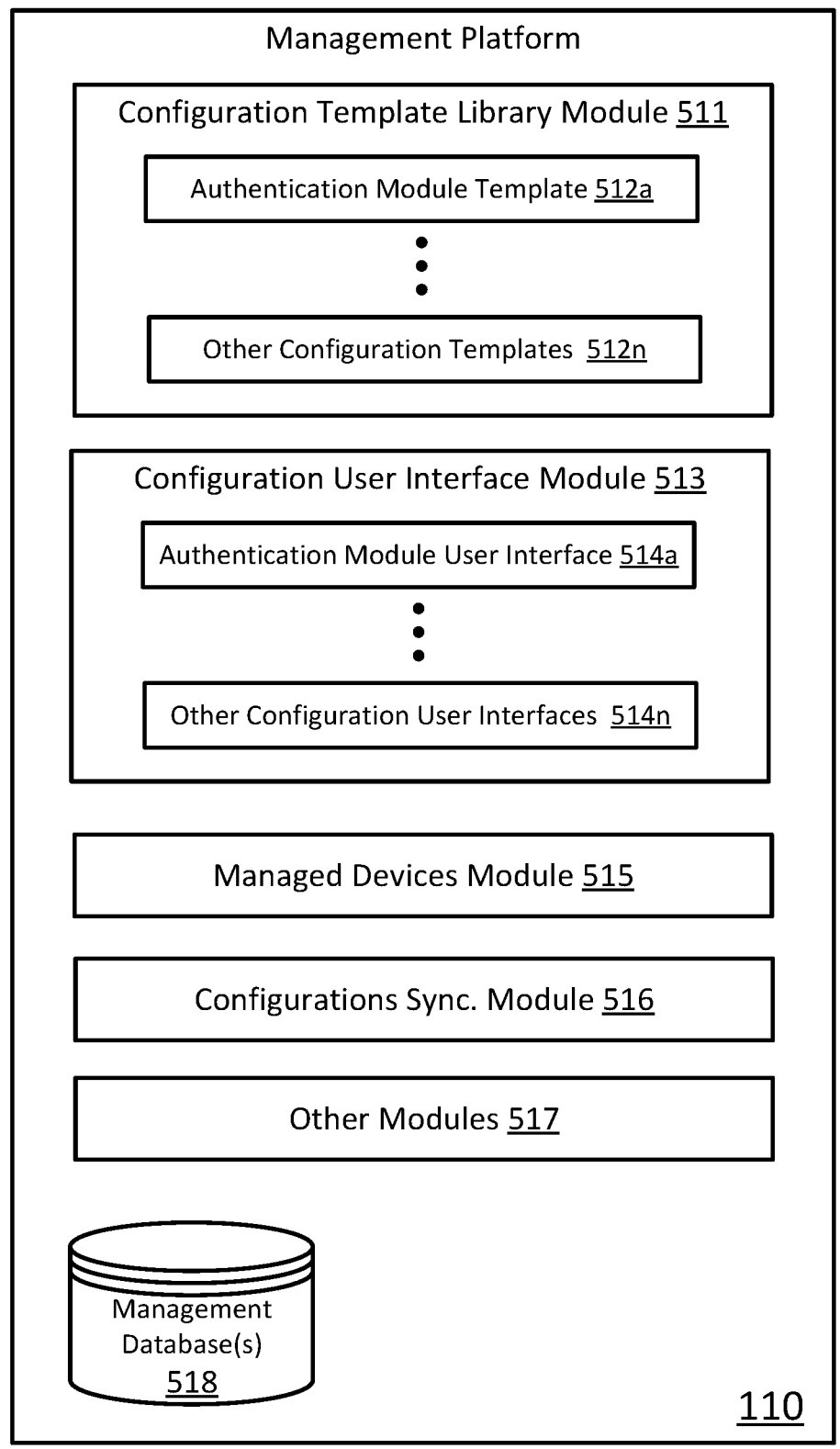
FIG. 5 shows a simplified example of a management platform of the operational environment in FIG. 1, in accordance with some embodiments.

FIG. 5 shows a simplified example of the management platform 110 of the operational environment 100 of FIG. 1, in accordance with some embodiments. In general, the management platform 110 includes a configuration template library module 511, a configuration user interface module 513, a managed devices module 515, a configuration synchronization module 516, other modules 517, and management databases 518. The configuration template library module 511 includes configuration templates, such as an authentication module template 512a, and other configuration templates 512n. The configuration user interface module 513 is operable to provide user interfaces (e.g., via a web-portal or other applications), such as an authentication module user interface 514a and other configuration user interfaces 514n.

The management platform 110 provides many different functionalities, including: maintaining available user device configurations, and also maintaining collections of configurations that are based on security standards; receiving administrator selections of configurations that apply to identified groups of user devices; providing local device agents to the identified user devices to register those user devices, and to enable implementation and remediation of configurations; providing selected configurations and any modules needed to implement the configurations to user devices; and generating reports that detail compliance statuses of those user devices. For example, the management platform 110 may advantageously configure the authentication gateway module 354 to communicate with a particular identity provider service 130 and may provide the required settings to the authentication gateway module 354 for communication with that identity provider service 130.

The management platform 110 includes one or more of the management databases 518 that store different data that is used during processes for determining sets of configurations to associate with groups of user devices and methods for implementing a set of configurations on a user device and validating compliance with the configurations during scheduled intervals. In some embodiments, the data stored in the management databases 518 specifies or represents a library of separate configurations or collections of configurations, sets of configurations selected by administrators of network platforms 120a-n, groups of user devices selected by administrators of network platforms 120a-n, and reportable data that is determined from data reported by groups of computing devices. Individual, pre-built scripts for implementing individual configurations may also be stored in the management databases 518. The scheduled intervals may range from minutes (e.g., every 5 min or 15 minutes), to hours (e.g., every hour), to days (e.g., every day, every other day), to an event-based scheduled interval (e.g., on user device boot-up). In some embodiments, two or more scheduled intervals may be used simultaneously (e.g., checking configurations on user device boot-up and then every 15 minutes thereafter).

The management platform 110 includes computer software instructions—e.g., different software modules 511 through 517—that are used to carry out different aspects of methods for determining sets of configurations to associate with groups of user devices and for implementing a set of configurations on a user device and validating compliance with the configurations during scheduled intervals. Examples of the other modules 517 that are not shown include: module(s) for generating configurations; module(s) for determining sets of configurations; module(s)for determining groups of user devices; module(s) for generating installers of device agents; and module(s) for generating reports and alerts.

A simplified example hardware implementation of a computing device to implement all or a portion of the management platform 110 is shown in FIG. 14. Additional details regarding the management platform 110 are described in U.S. Pat. No. 11,102,251 B1, issued on Aug. 24, 2021, and entitled "Systems and Methods for Deploying Configurations on Computing Devices and Validating Compliance with the Configurations During Scheduled Intervals", which is owned by the present assignee and is incorporated herein by reference in its entirety.

Figure 6:
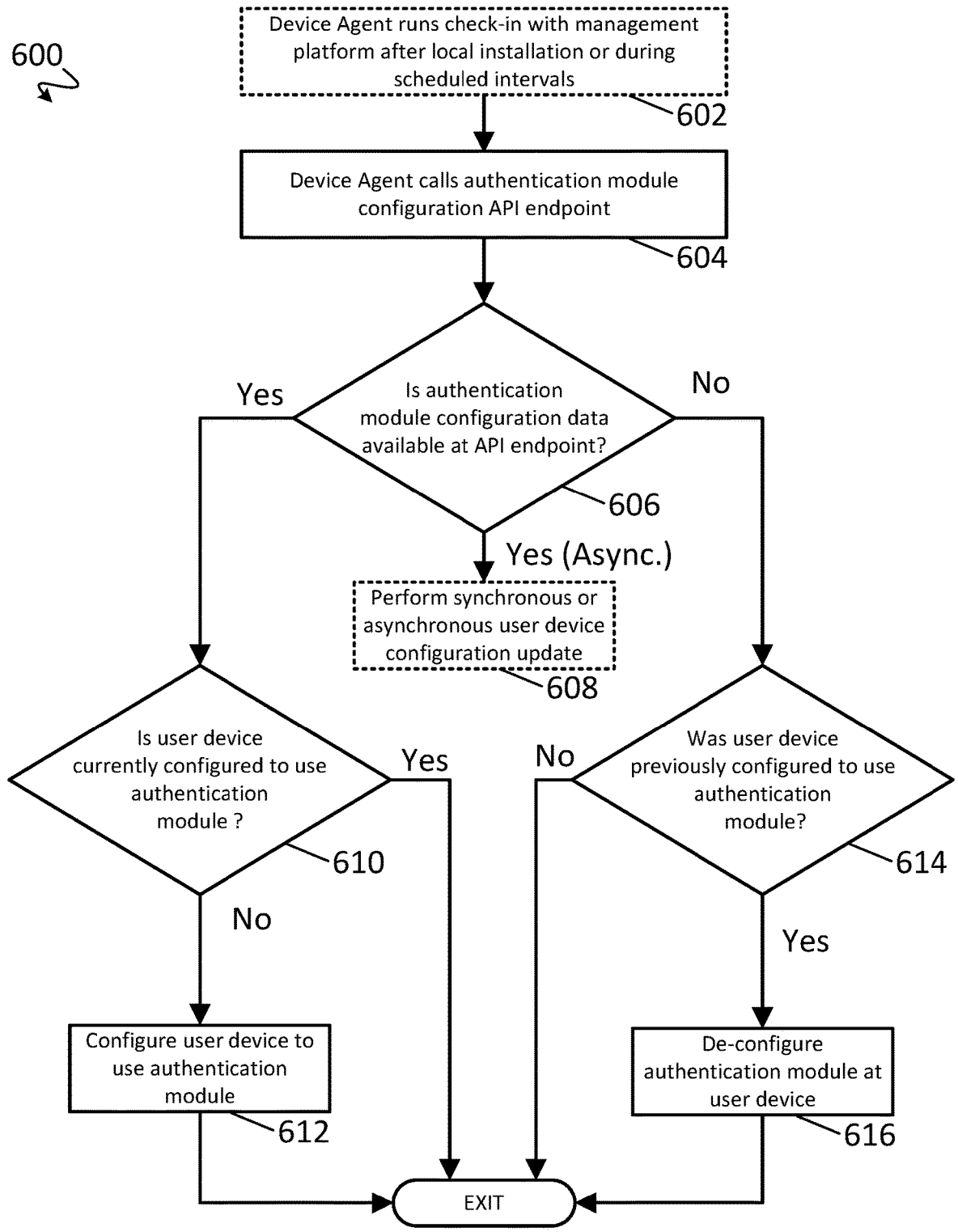
FIG. 6 shows a simplified portion of a process for configuring the authentication gateway module shown in FIG. 4, in accordance with some embodiments.

FIG. 6 shows a simplified portion of an example process 600 for configuring the authentication gateway module ("authentication module") 354 shown in FIG. 4, in accordance with some embodiments. The particular steps, order of steps, and combination of steps are shown for illustrative and explanatory purposes only. Other embodiments can implement different particular steps, orders of steps, and combinations of steps to achieve similar functions or results.

At step 602, a device agent 350 of the user device 226a runs a check-in with the management platform 110 after local installation of the device agent 350 at the user device 226a or during a scheduled interval specified by the management platform 110. As part of the check-in, at step 604, the device agent 350 calls an authentication module configuration application programming interface (API) endpoint (e.g., using the configuration synchronization module 516) at the management platform 110 to determine if authentication module configuration data is available for the authentication gateway module 354. An API endpoint is one end of a communication channel between two services, modules, and/or applications. Upon determining at step 606 that authentication module configuration data is available at the authentication module configuration API endpoint, flow continues to steps 608 and 610. That is, in some embodiments, at step 608, the device agent 350 and/or the authentication gateway module 354 perform an asynchronous configuration validation and/or update of the authentication gateway module 354 using authentication configuration data received from the management platform 110. In other embodiments, at step 608, the device agent 350 and/or the authentication gateway module 354 perform a synchronous configuration validation and/or update of the authentication gateway module 354 using authentication configuration data received from the management platform 110. In some embodiments, all or a portion of the authentication module configuration data received by the device agent 350 and/or the authentication gateway module 354 is stored in the encrypted credential database 362 and/or the system configuration database 364.

At step 610, if it is determined (e.g., by the device agent 350) that the user device 226a is already configured to use the authentication gateway module 354, the process 600 may exit until step 602 is triggered again (e.g., at a scheduled interval and/or at user device boot-up). If step 608 is implemented as an asynchronous update of the authentication gateway module 354, the user device configuration update may continue after the process 600 exits. In some embodiments, upon exiting the process 600, the process 700 shown in FIG. 7 and described below begins.

However, if it was determined at step 610 that the authentication gateway module 354 is not already configured, the flow of the process 600 continues to step 612. At step 612, the user device 226a is configured to use the authentication gateway module 354 (i.e., the authentication gateway module 354 is thereby enabled). The process 600 may then exit until step 602 is triggered again (e.g., at a scheduled interval). If step 608 is implemented as an asynchronous update of the authentication gateway module 354, the user device configuration update may continue after the process 600 exits.

If it was determined at step 606 that authentication module configuration data is not available at the authentication module configuration API endpoint, flow continues to step 614. At step 614, it is determined (e.g., by the device agent 350), if the user device 226a was previously configured to use the authentication gateway module 354 (i.e., was the authentication gateway module 354 previously enabled). If it is determined at step 614 that the authentication gateway module 354 was previously configured, flow continues to step 616. At step 616, the authentication gateway module 354 is de-configured (i.e., disabled) at the user device 226a. That is, in such embodiments, lack of authentication module configuration data for the authentication gateway module 354 at the management platform 110 indicates that an administrator has chosen to disable the use of the authentication gateway module 354 at the user device 226a. After step 616, the process 600 may then exit until step 602 is triggered again (e.g., at a scheduled interval or at user device boot-up). Thus, in some embodiments, the authentication gateway module may be enabled based on authentication module configuration data received from the management platform 110 during a first time period corresponding to a first scheduled interval and may be disabled during a second time period corresponding to a second scheduled interval based on an absence of authentication module configuration data received from the management platform 110 during the second time period.

Similarly, if it was determined at step 614 that the user device 226a was not previously configured to use the authentication gateway module 354, the process 600 may then exit until step 602 is triggered again.

FIGS. 7-13 show simplified portions of processes for user authentication, local user account creation, local user account migration, and user credential synchronization using the authentication gateway module 354 shown in FIG. 4, in accordance with some embodiments.

Figure 7:
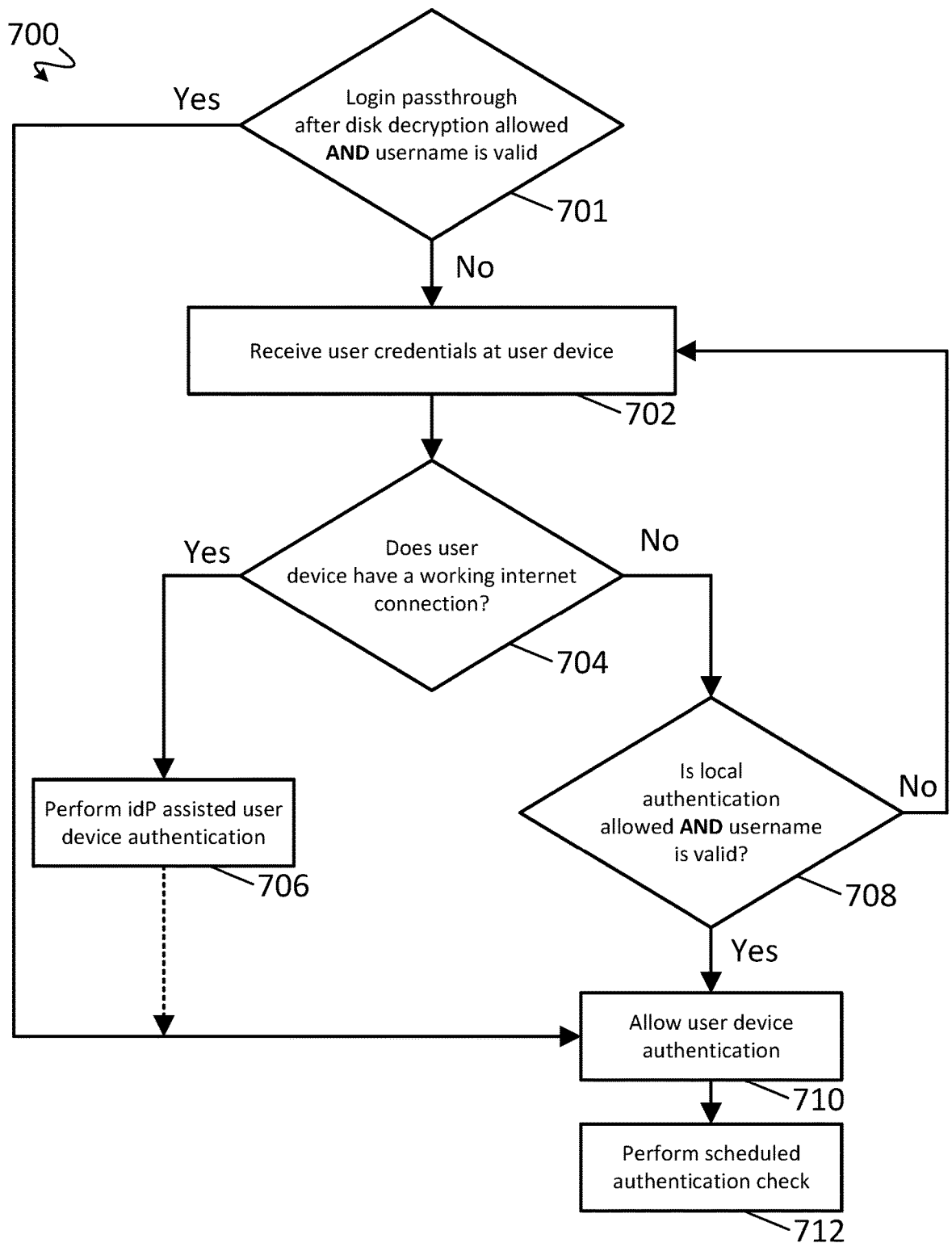
FIGS. 7-13 show simplified portions of processes for user authentication, local user account creation, local user account migration, and user credential synchronization using the authentication gateway module shown in FIG. 4, in accordance with some embodiments.

FIG. 7 shows a simplified portion of a process 700 for authenticating a user at a user device (e.g., the user device 226a) using the authentication gateway module ("authentication module") 354 shown in FIG. 4, in accordance with some embodiments. The particular steps, order of steps, and combination of steps are shown for illustrative and explanatory purposes only. Other embodiments can implement different particular steps, orders of steps, and combinations of steps to achieve similar functions or results.

Some user devices allow a user to encrypt all or a portion of the contents of a non-volatile data storage device, such as a disk-drive of the user device, when the user device is not in use and decrypt those contents when the user enters valid user credentials at a login screen. Such user credentials typically include a username and a user password. In some scenarios, after successful disk decryption, the user device will present the user with a second login screen. Upon entering valid user credentials at the second login screen, the user will be logged into the user device. In other scenarios, designated herein as "login passthrough", after successful disk decryption at the user device, the user is allowed to bypass the second login screen. Thus, in some embodiments, before step 701, the user device 226a may have received from a user thereof, user credentials that were authenticated by the disk encryption/decryption module 372 of the user device 226a and an encrypted disk, or other non-volatile data storage device of the user device 226a, is successfully decrypted by the disk encryption/decryption module 372.

In some embodiments, before the process 700 begins, it is determined by the device agent 350 if the authentication gateway module 354 is enabled (e.g., as described with reference to the process 600 shown in FIG. 6). Upon determining by the device agent 350 that the authentication gateway module is enabled, the process 700 is performed.

At step 701 it is determined by the authentication gateway module 354 if login passthrough after disk decryption is allowed AND if the username of the user credentials provided by the user during the disk decryption process is a valid username according to the authentication gateway module 354 (e.g., based on user credentials stored at the OS credential database 360 and/or the encrypted credential database 362). In some embodiments, login passthrough is allowed or disallowed in accordance with a parameter received from the management platform 110 and set, stored, and/or retrieved by the device agent 350 at the user device 226a. In some embodiments, the device agent 350 may configure a setting of an operating system of the user device 226a to allow or disallow login passthrough.

Upon determining at step 701 that login passthrough after disk decryption is allowed AND if the username provided by the user during the disk decryption process is valid according to the authentication gateway module 354 (e.g., the username matches a username stored at the encrypted credential database 362 and/or the OS credential database 360), the flow of the process continues to step 710. At step 710, the authentication gateway module 354 allows user device authentication to be conducted by the OS authentication module 370. The OS authentication module 370 is part of, or is managed by, an operating system (OS) of the user device 226a. All or a portion of user device authentication conducted by the OS authentication module 370 involves performing a comparison, by the OS authentication module 370, of user credentials received by the OS authentication module 370 against user credentials retrieved by the OS authentication module 370 from the OS credential database 360 (i.e., a local, or cached-remote database). For example, in some embodiments disclosed herein, the user credentials are transmitted from the authentication gateway module 354 to the OS authentication module 370. The OS authentication module 370 then compares those user credentials to user credentials stored in the OS credential database 360. The OS authentication module 370 may then send an authentication response to the authentication gateway module 354 indicating that the user credentials are or are not authenticated by the OS authentication module 370.

As disclosed herein, "allowing user device authentication" is taken to mean that the authentication gateway module 354 permits/enables/uses/configures the OS authentication module 370 of the user device 226a to carry out user authentication in accordance with OS authentication parameters set at the user device 226a. Such OS authentication parameters may be OS settings that were configured by the device agent 350 in accordance with parameters received from the management platform 110. Thus, the authentication gateway module 354 is said to be an authentication "gateway" module in that it selectively controls whether the OS authentication module 370 is permitted to authenticate a user at the user device 226a. For example, if the authentication gateway module 354 does not permit the OS authentication module 370 to authenticate a user at the user device 226a, the user will not be logged into the user device 226a even if the user credentials would have normally logged the user into the user device 226a.

In some embodiments, the encrypted credential database 362 is instantiated (i.e., created) at the user device 226a by the authentication gateway module 354 after the authentication gateway module 354 receives a first authentication response from the OS authentication module 370 indicating that the user credentials were successfully authenticated by the OS authentication module 370. In such embodiments, after instantiating the encrypted credential database 362, the authentication gateway module 354 stores the user credentials at the encrypted credential database 362 for later use as disclosed herein.

Figure 11:
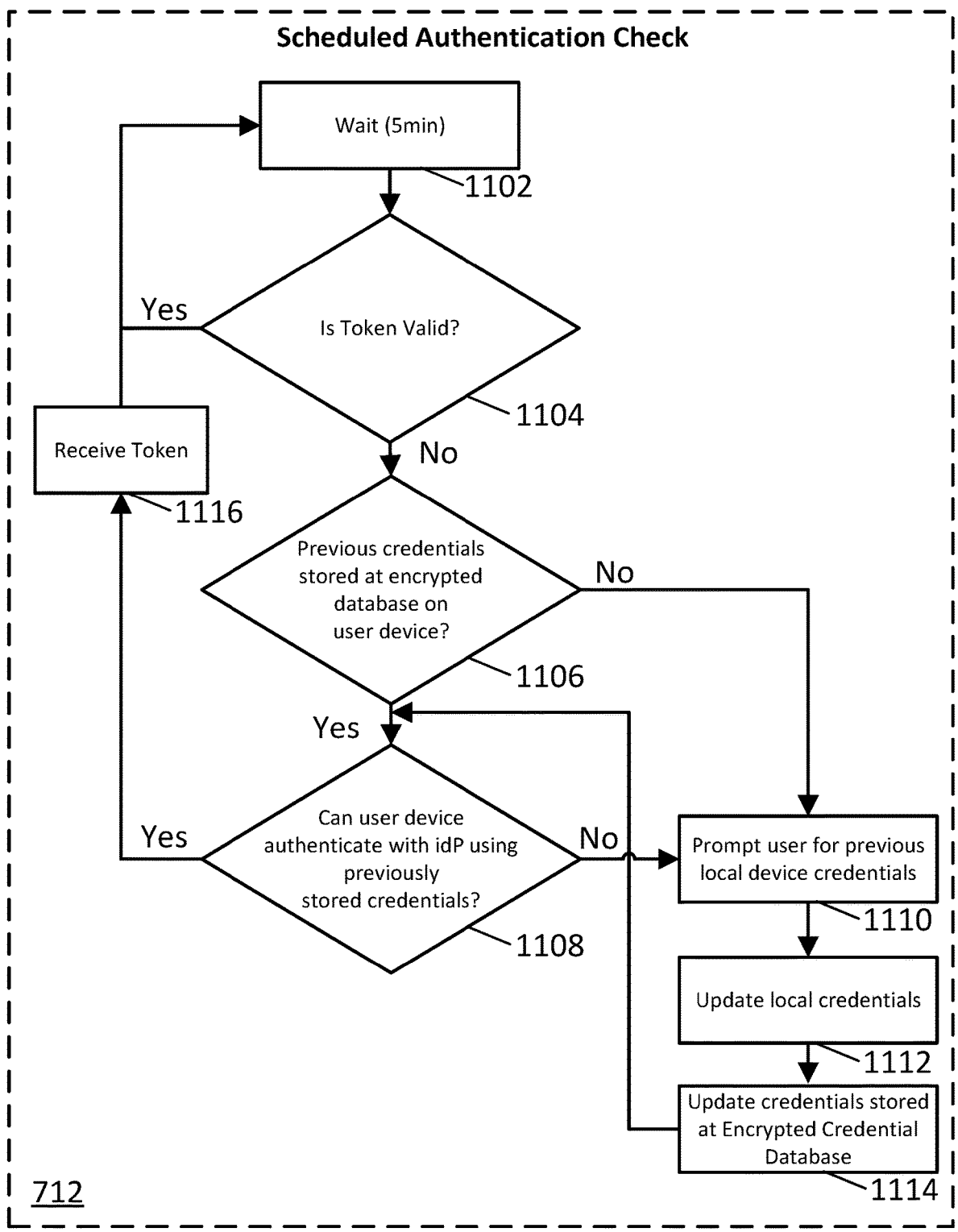

In some embodiments (not shown), if user device authentication fails at step 710, flow of the process 700 reverts to step 702. If the user is successfully authenticated at step 710, the flow of the process 700 continues to step 712, during which scheduled authentication checks are performed. Details of step 712 are shown in FIG. 11.

If it was determined at step 701 that either login passthrough after disk decryption is not allowed, or that the username provided by the user is not valid according to the authentication gateway module 354, flow continues to step 702. At step 702, user credentials are received by the authentication gateway module 354 at the user device 226a. In some embodiments, the authentication gateway module 354, or another module of the device agent 350, provides a graphical user interface using a display of the user device 226a to receive the user credentials from the user via an input interface of the user device 226a, a keyboard, a touchpad, a camera, a smart-card, a near-field communication device, a smartphone, or another input device. In some embodiments, the user credentials include a username and password. In other embodiments, the user credentials include information received by the user device 226a using two-factor authentication. In some embodiments, the graphical user interface provided by the authentication gateway module 354 advantageously includes, and is displayed in accordance with, display settings, graphical assets, and/or other display preferences that were sent to the authentication gateway module 354 by the management platform 110 (e.g., as part of step 608 of FIG. 6) as part of the authentication module configuration data. As such, the graphical user interface may be customized with assets such as graphics, instructions, and/or other text as desired by an enterprise. For example, a company logo of the enterprise may be displayed at the login screen of the user device 226a.

Figure 8:
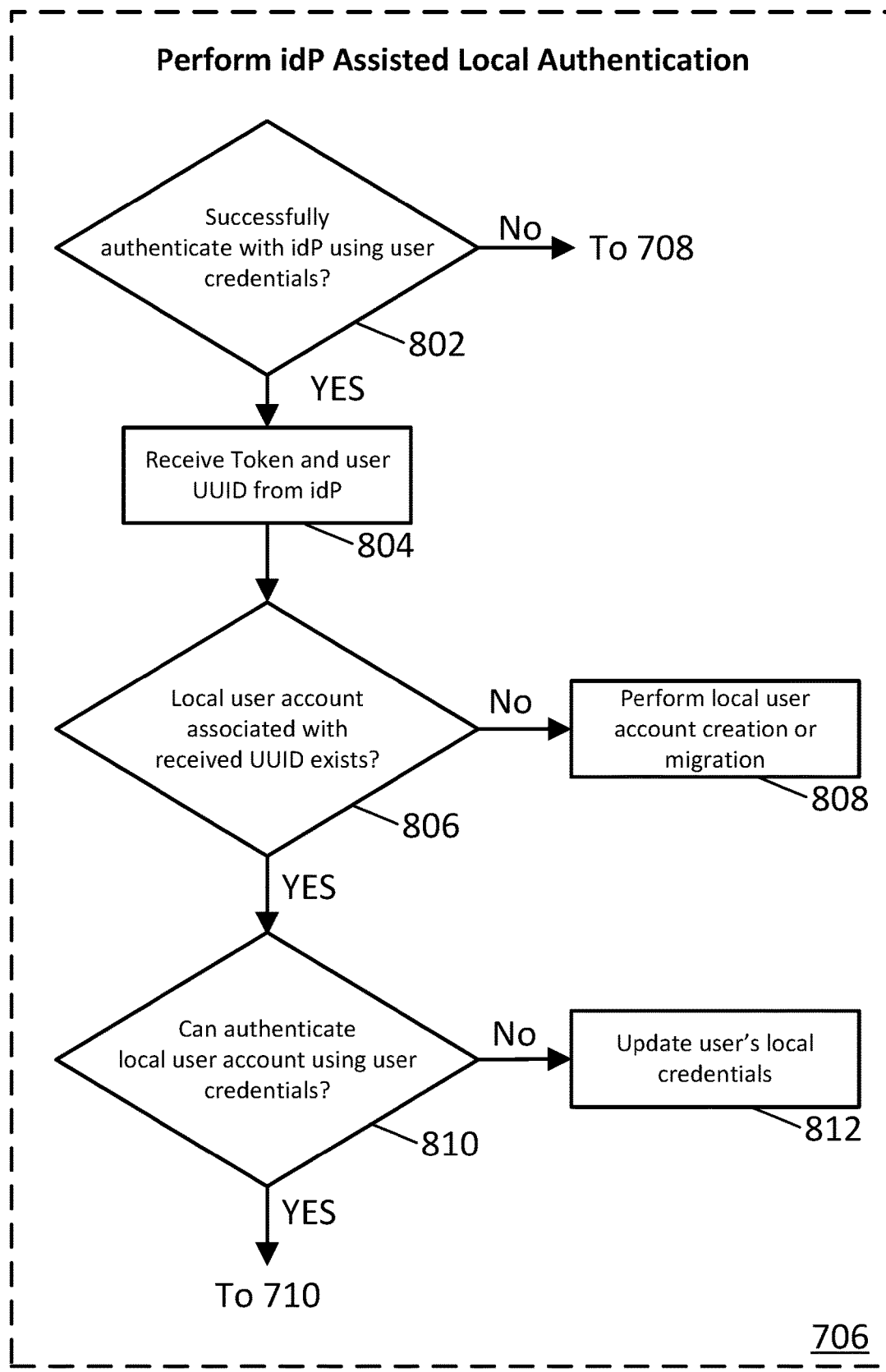

At step 704, it is determined by the authentication gateway module 354 if the user device 226a has a working internet connection (i.e., such that the authentication gateway module 354 can communicate with the identity provider service 130). If it is determined at step 704 that the user device 226a has a working internet connection, the flow continues to step 706. At step 706, the authentication gateway module 354 performs identity provider service (idP) assisted user device authentication. Details of step 706 are shown in FIG. 8. As described below with respect to FIG. 8, flow may conditionally continue from step 706 to step 710, as illustrated by a dashed line.

If it was determined at step 704 that the user device 226a does not have a working internet connection, flow continues to step 708. At step 708, it is determined if local authentication is allowed AND if the username provided by the user at step 702 is valid according to the authentication gateway module 354 (e.g., the username matches a username stored at the encrypted credential database 362 and/or the username matches a username stored at the OS credential database 360). As disclosed herein and described above, "allowing local authentication" is taken to mean that the authentication gateway module 354 allows the OS authentication module 370 of the user device 226a to carry out user authentication in accordance with OS authentication parameters set at the user device 226a. Such OS authentication parameters may be OS settings that were configured by the device agent 350 in accordance with parameters received from the management platform 110. Once again, the authentication gateway module 354 is thus said to be an authentication "gateway" module in that it selectively controls whether the OS authentication module 370 is permitted to authenticate a user at the user device 226a. If local authentication is allowed AND the username is valid, flow continues to step 710 which was described above. If local authentication is not allowed or the username is not valid, flow continues back to step 702 which was described above.

FIG. 8 provides details of step 706 of FIG. 7, in which identity provider service assisted local authentication is performed, in accordance with some embodiments. The particular steps, order of steps, and combination of steps are shown for illustrative and explanatory purposes only. Other embodiments can implement different particular steps, orders of steps, and combinations of steps to achieve similar functions or results.

At step 802, it is determined if the authentication gateway module 354 can successfully authenticate with the identity provider service 130 using the user credentials received at step 702 of FIG. 7. In some embodiments, an indication of successful authentication from the identity provider service 130 involves receiving, by the authentication gateway module 354, an authentication response from the identity provider service 130 indicating authentication success or failure. In some embodiments, the authentication response may include an authentication token and/or a ticket as well as other data. A token in this context is a data object that includes security credentials associated with a login session. In some embodiments, a token identifies a user, a group that the user is part of (e.g., "admin", "engineering", "marketing", "HR", etc.), the user's privileges, and/or an expiration time and/or date. Thus, if it is determined at step 802 that the authentication gateway module 354 can successfully authenticate with the identity provider service 130, at step 804 a token and associated universally unique identifier (UUID) is received from the identity provider service 130. The UUID is a user identifier associated with the user credentials at the identity provider service 130. The UUID may be a data object (e.g., a 128-bit label), or it may be an alphanumeric identifier (e.g., user1@enterprise123.com, userFirstName_userLastName, etc.,). In some embodiments, the UUID is included as part of the Token data object. At step 806, it is determined, by the authentication gateway module 354, if a local user account exists at the user device that is associated with the received UUID. In some embodiments, the received UUID is checked by the authentication gateway module 354 against UUIDs that are stored in the OS credential database 360 and/or the encrypted credential database 362 to determine if there is a local user account associated with the received UUID. In this context, a "local user account" is a logical construct implemented at a user device that associates a user with a storage location, such as a "home directory", in non-volatile memory and/or volatile memory of the user device as well as particular applications, permissions, preferences, system settings, and so on. In some embodiments, each local user account has an associated OS credential database 360 that is stored within the home directory of that local user account. A given user device may have a single local user account, or it may have multiple local user accounts. For example, multiple users may each have a local user account on a shared user device, or a single user may have multiple local user accounts on a user device (e.g., a "personal" and a "work" or "school" account).

Figure 9:
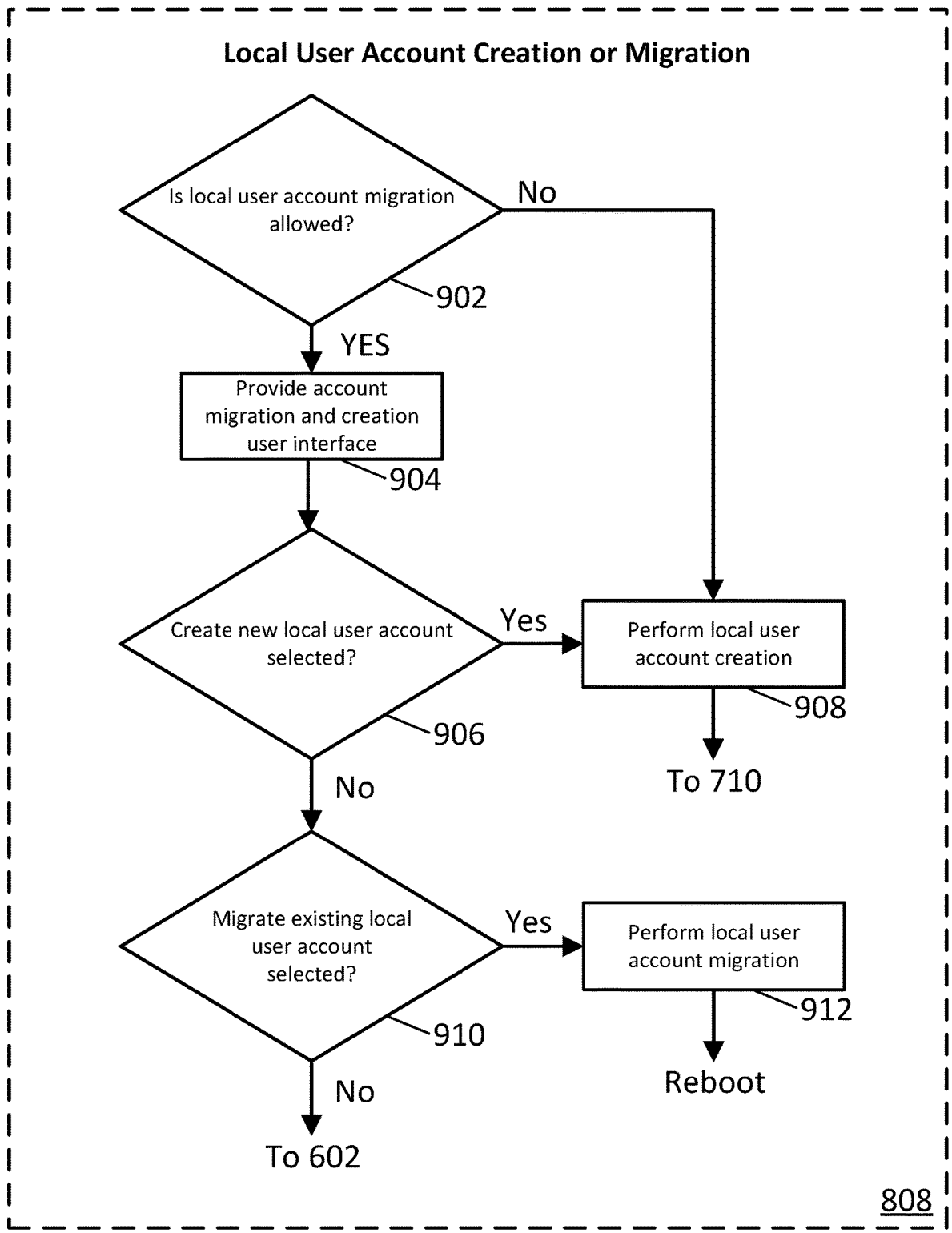

If it is determined at step 806 by the authentication gateway module 354 that a local user account associated with the received UUID does not exist at the user device 226a, flow continues to step 808. At step 808, local account creation or migration is performed, details of which are shown in FIG. 9 and described below. However, if it is determined at step 806 that a local user account is associated with the received UUID exists, flow continues to step 810. At step 810, the authentication gateway module 354 determines if the local user account identified at step 806 can be authenticated using the user credentials received at step 702. In some embodiments, the authentication gateway module 354 determines if the local user account identified at step 806 can be authenticated using the user credentials received at step 702 by comparing them to credentials stored in the OS credential database 360. In other embodiments, the authentication gateway module 354 determines if the local user account identified at step 806 can be authenticated using the user credentials received at step 702 by transmitting them to the OS authentication module 370 and receiving an OS authentication response therefrom.

Figure 10:
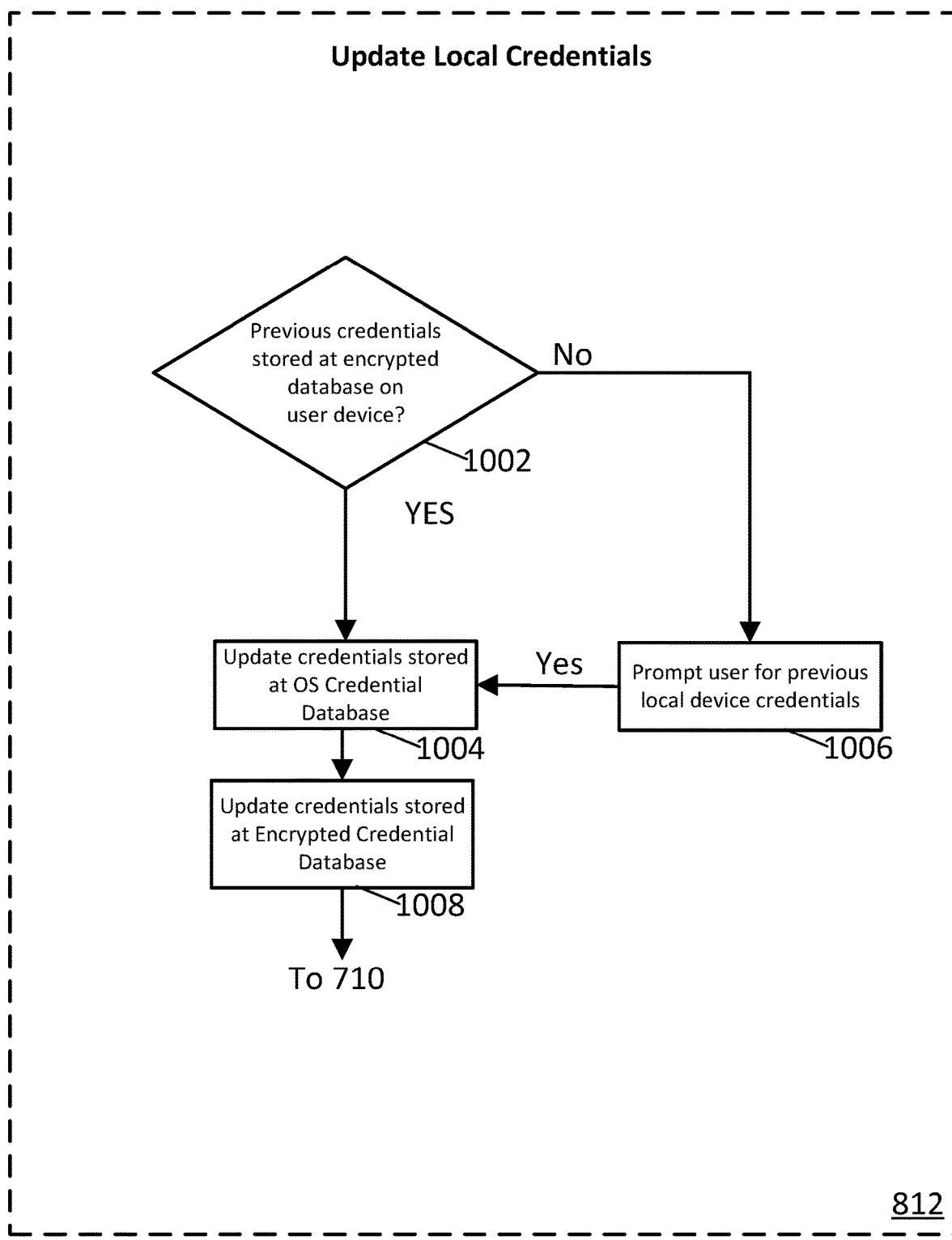

If it is determined at step 810 that the local user account identified at step 806 is not able to be authenticated using the user credentials received at step 702, flow continues to step 812. At step 812, local credentials associated with the user credentials received at step 702 are updated, as shown in FIG. 10 and described below. However, if it was determined at step 810 that the local user account identified at step 806 can be authenticated using the user credentials received at step 702, flow continues to step 710 shown in FIG. 7 and described above, whereupon the authentication gateway module 354 allows user device authentication to be conducted by the OS authentication module 370.

FIG. 9 provides details of step 808 of FIG. 8, in which local user account creation or migration is performed, in accordance with some embodiments. The particular steps, order of steps, and combination of steps are shown for illustrative and explanatory purposes only. Other embodiments can implement different particular steps, orders of steps, and combinations of steps to achieve similar functions or results.

At step 902, it is determined (e.g., by the authentication gateway module 354) if local user account migration is allowed, e.g., according to parameters stored in the system configuration database 364 and which were set using the management platform 110. Local user account migration is taken to mean that, given an existing local user account that is on the user device, modifying that local user account such that after migration it is associated with a different local user account, a different set of user settings, a different set of user permissions, a different user group association, different user credentials, different remote identity provider service credentials, and/or other parameters as compared to the original local user account. One simple example scenario for local user account migration involves an employee that wishes to use their personal laptop (i.e., a user device) at work. In this scenario, a personal local user account on the laptop may be migrated to a "work" local user account such that the migrated local user account has restricted permissions as compared to the original permissions of the personal local user account.

Figure 12:
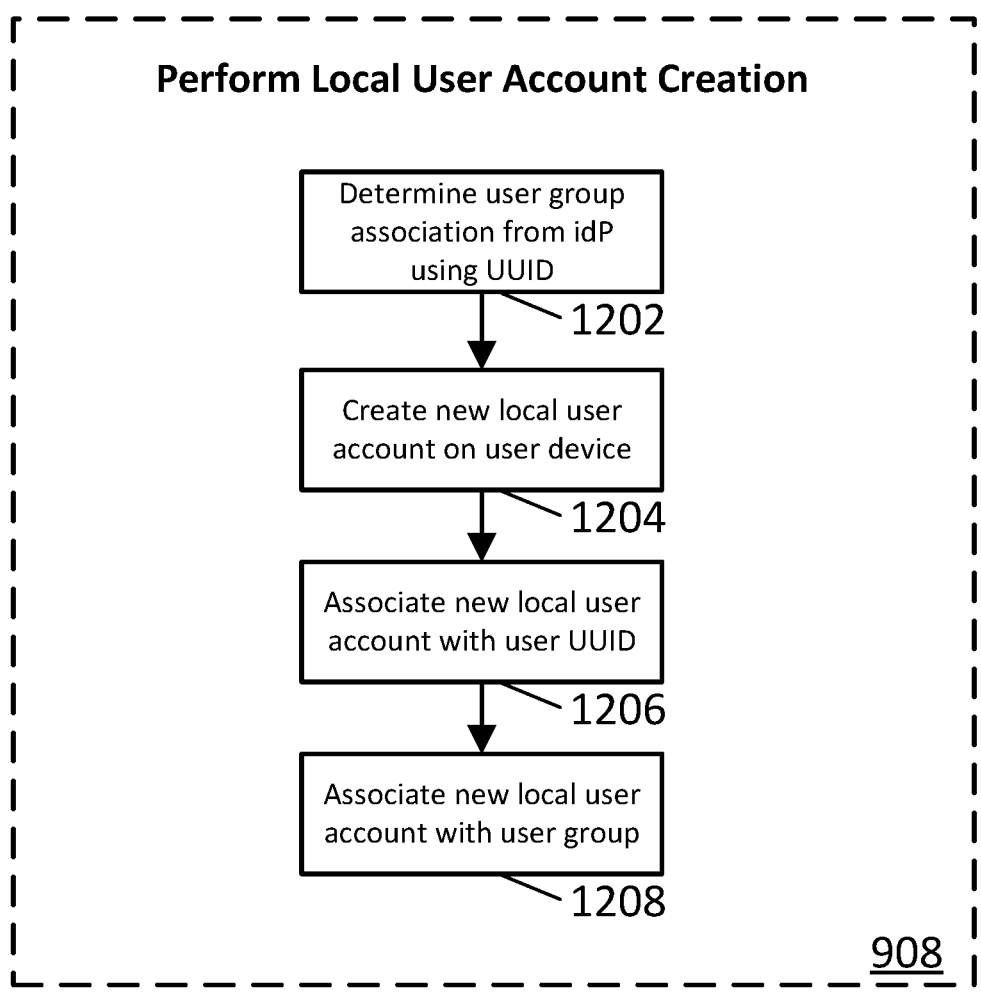

If it is determined at step 902 that local user account migration is not allowed, flow continues to step 908. At step 908, a new local user account is created on the user device 226a. Details of step 908 are shown in FIG. 12 and described below. After step 908, the flow returns to step 710 of FIG. 7 described above. However, if it was determined at step 902 that local user account migration is allowed, flow continues to step 904. At step 904, a graphical user interface is provided at a display of the user device (e.g., by the authentication gateway module 354) to receive an input from the user indicating whether they would like to proceed with local user account migration, user local account creation, or neither.

At step 906, it is determined if the user has indicated that they would like to proceed with local user account creation. If it is determined at step 906 that the user indicated that they would like to proceed with local account creation, flow continues to step 908. At step 908, a new local user account is created on the user device. After step 908, the flow returns to step 710 of FIG. 7 described above. Details of step 908 are shown in FIG. 12 and described below. If it is determined at step 906 that the user has not indicated that they would like to proceed with local user account creation, flow continues to step 910.

Figure 13:
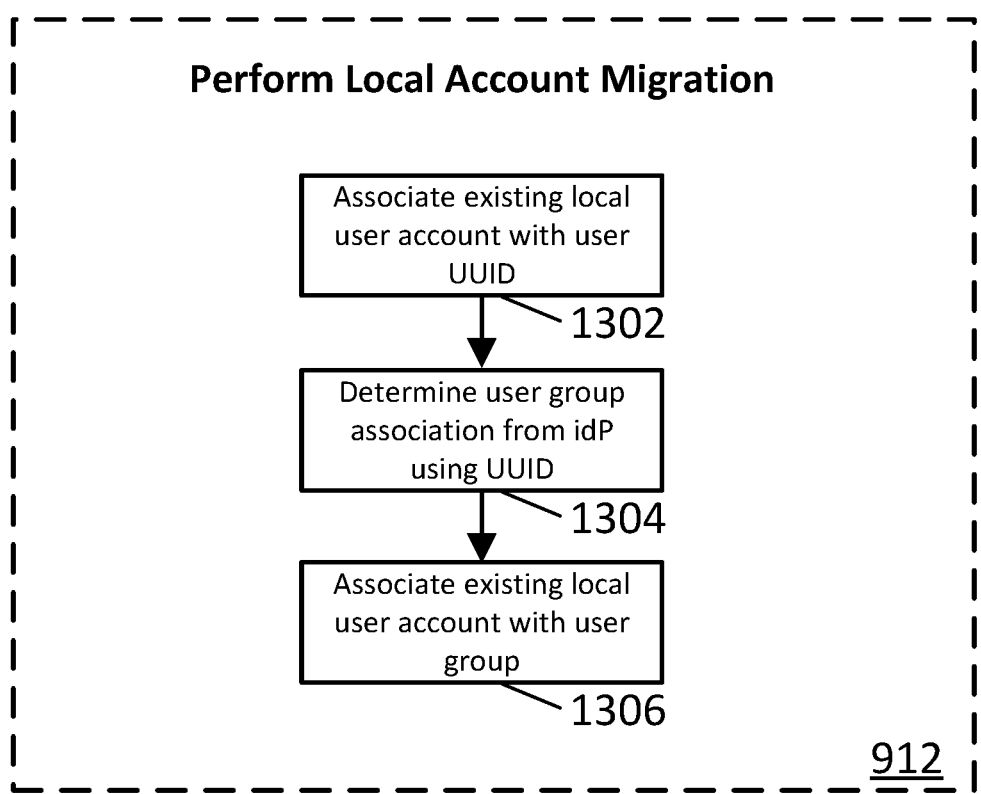

At step 910, it is determined if the user has indicated that they would like to proceed with local user account migration. If it is determined at step 910 that the user does not want to proceed with local user account migration, flow returns to step 602 of FIG. 6 described above. However, if it was determined at step 910 that the user would like to proceed with local user account migration, flow continues to step 912. At step 912, local user account migration is performed on the user device. Details of step 912 are shown in FIG. 13 and described below. After step 912, the user device reboots, after which step 602 of FIG. 6 and/or step 701 of FIG. 7 may be performed to begin the process 600 and/or the process 700, respectively, again.

In some embodiments, an "orphaned" home directory within the non-volatile data storage device of the user device 226a is identified by the device agent 350 as part of, or preceding, step 904. An orphaned home directory is a data region in the non-volatile data storage of the user device 226a that is not associated with a local user account of the user device 226a (such as if a local user account was deleted without removing the data, or if the home directory was transferred to the user device 226a from another user device). If it is determined by the authentication gateway module 354 that the orphaned home directory is associated with a user name associated with the identity provider service 130, the account migration and creation user interface described at step 904 may include the orphaned home directory in a list of options that a user may select from during local user account migration and creation. In some embodiments, an identifier such as "Home Folder" may be appended to the option (e.g., with the associated user name) displayed by the account migration and creation user interface at step 904.

In some embodiments, the orphaned home directory presented at step 904 may be selected by a user as part of step 906. If the orphaned home directory is selected at step 906, a new local user account is created (e.g., as described with reference to step 908) and the new local user account is associated with the orphaned home directory rather than with a new default home directory. In such embodiments, a user may optionally supply as part of step 908, a password for resetting an OS credential database 360 located in the orphaned home directory. That is, because the orphaned home folder is just a directory of user data—i.e., files and folders—and not an actual local user account, the orphaned home folder is essentially a folder of "unowned" data. However, the orphaned home folder could contain a preexisting OS credential database 360 that is protected by a password. Thus, in some embodiments, the user is given the option (e.g., as part of step 904, 906, or 908) to provide a password associated with the preexisting OS credential database 360 and thereby retain any credentials stored within it. If no OS credential database 360 exists within the orphaned home directory, or the old password is not provided, a new OS credential database 360 may be created within the orphaned home directory as part of the new local user account creation at step 908.

FIG. 10 provides details of step 812 of FIG. 8, in which an update of local credentials is performed, in accordance with some embodiments. The particular steps, order of steps, and combination of steps are shown for illustrative and explanatory purposes only. Other embodiments can implement different particular steps, orders of steps, and combinations of steps to achieve similar functions or results.

At step 1002, it is determined (e.g., by the authentication gateway module 354), if previously authenticated user credentials are stored at the encrypted credential database 362 on the user device 226a. The previously authenticated user credentials are credentials that were previously confirmed by the authentication gateway module 354 to authenticate the associated local user account (e.g., similarly, or the same, as described with reference to step 810 of FIG. 8).

If it is determined at step 1002 that previously authenticated user credentials are stored at the encrypted credential database 362, flow continues to step 1004. At step 1004, the authentication gateway module 354 retrieves the previously authenticated user credentials from the encrypted credential database 362 and uses those credentials to attain read and write privileges for the OS credential database 360. That is, the authentication gateway module 354 "unlocks" the OS credential database 360 using the previously authenticated user credentials. The authentication gateway module 354 then replaces (e.g., overwrites by a store command) user credentials associated with the local user account that are stored in the OS credential database 360 with the user credentials that were entered at 702 of FIG. 7 (and which were successfully authenticated with the identity provider service 130 at step 802 of FIG. 8). At step 1008, the previously authenticated credentials that are stored at the encrypted credential database 362 are replaced (e.g., overwritten by a store command) with the user credentials that were entered at step 702. As such, the user credentials needed to authenticate a user at the user device 226a are advantageously synchronized with the user credentials needed to authenticate the user at the identity provider service 130. Flow then continues back to step 710 of FIG. 7, whereupon the authentication gateway module 354 allows user device authentication to be conducted by the OS authentication module 370.

Thus, in scenarios in which local user credentials are out of synchronization with user credentials associated with the identity provider service 130, the authentication gateway module 354 advantageously updates the local user credentials to match those associated with the identity provider service 130 without requiring user intervention. This feature is especially advantageous in instances in which the user has forgotten their previous local user account password. For example, if a user has forgotten their local user account password, the user or an administrator may simply update the user credentials associated with the identity provider service and ask the user to login using those new credentials. As such, a scenario that might have previously required in-person, or personalized remote intervention to recover the previous credentials by an administrator is advantageously simplified, thereby providing a significant technical advantage as compared to conventional solutions.

If, however, it was determined at step 1002 that previously authenticated user credentials are not stored at the encrypted credential database 362 on the user device 226a, flow continues to step 1006. At step 1006, the authentication gateway module 354 provides a graphical user interface at a display of the user device 226a which prompts the user for their previous credentials. The process then continues to step 1004 which was described above.

FIG. 11 provides details of step 712 of FIG. 7, in which a scheduled authentication check is performed, in accordance with some embodiments. The particular steps, order of steps, and combination of steps are shown for illustrative and explanatory purposes only. Other embodiments can implement different particular steps, orders of steps, and combinations of steps to achieve similar functions or results.

At step 1102, the process of step 712 waits (i.e., pends) until triggered as part of a scheduled interval that may be specified as a parameter received by the authentication gateway module 354 from the management platform 110. In some embodiments, the scheduled interval is 5 minutes. In other embodiments, the scheduled interval is 10 min, 15 min, 30 minutes, one hour, as triggered (e.g., by the management platform 110) or another scheduled interval as desired or required. After waiting for the specified amount of time at step 1102, flow continues to step 1104. At step 1104 the authentication gateway module 354 determines if the authentication token received from the identity provider service 130 at step 804 of FIG. 8, or at step 1116 of FIG. 11 described below, is valid. For example, as described above, the authentication token may include an expiration time. As such, determining by the authentication gateway module 354 if the authentication token is valid can involve determining, by the authentication gateway module 354, if the authentication token has expired. In other embodiments, determining by the authentication gateway module 354 if the authentication token is valid can involve determining, by the authentication gateway module 354, that the authentication gateway module 354 was not able to receive a refresh token from the identity provider service 130.

If it is determined at step 1104 that the authentication token is valid, the flow returns to step 1102 until the next scheduled interval. If it is determined at step 1104 that the authentication token is not valid, flow continues to step 1106. At step 1106 it is determined by the authentication gateway module 354 if previously authenticated user credentials are stored at the encrypted credential database 362, as was described with reference to step 1002 of FIG. 10. If it is determined at step 1106 that previously authenticated credentials are stored at the encrypted credential database 362, flow continues to step 1108. At step 1108, it is determined, by the authentication gateway module 354, if the previously authenticated user credentials are valid according to the identity provider service 130, i.e., can the user credentials previously stored at the encrypted credential database 362 be successfully authenticated by the identity provider service 130. In some embodiments, at step 1108, the authentication gateway module 354 transmits the previously authenticated user credentials to the identity provider service 130 and receives an authentication response. If the identity provider service 130 determines that the previously authenticated credentials are valid, the identity provider service 130 may transmit an updated token to the authentication gateway module 354. The updated token is received by the authentication gateway module 354 at step 1116 and then flow returns to step 1102.

If it is determined by the authentication gateway module 354 at step 1106 that previously authenticated credentials are not stored at the encrypted credential database 362, or, if it was determined by the authentication gateway module 354 at step 1108 that the previously authenticated credentials are not valid according to the identity provider service 130, flow continues to step 1110. At step 1110, the authentication gateway module 354 provides a graphical user interface at a display of the user device 226a to prompt the user to enter user credentials that are associated with the identity provider service 130. At step 1112, the OS credential database 360 is updated to store the user credentials received at step 1110. In some embodiments, the process of step 1112 is implemented as described with reference to step 812 detailed in FIG. 10. At step 1114, the user credentials received at step 1110 are stored, by the authentication gateway module 354, at the encrypted credential database 362 (as was described with reference to step 1008 of FIG. 10). Flow then returns to step 1108, which was described above.

FIG. 12 provides details of step 908 of FIG. 9, in which a new local user account is created at the user device 226a, in accordance with some embodiments. The particular steps, order of steps, and combination of steps are shown for illustrative and explanatory purposes only. Other embodiments can implement different particular steps, orders of steps, and combinations of steps to achieve similar functions or results.

At step 1202, the authentication gateway module 354 determines, from the identity provider service 130, any user groups associated with the user UUID received at step 804 of FIG. 8 (e.g., "admin", "marketing", "engineering", etc.). In some embodiments, the user groups may be stored within a data object of a token received from the identity provider service at step 804. At step 1204, a new local user account is created at the user device 226a. Creation of the new local user account may be performed using the authentication gateway module 354, the system configuration modules 352, the OS authentication module 370, the device agent module 356, and/or the other modules 374 of the user device 226a. In general, the creation of a new local user account at the user device 226a involves creating a new logical construct on the user device 226a that associates the UUID with a storage location, e.g., a home directory, in non-volatile memory device and/or volatile memory device of the user device as well as particular applications, permissions, preferences, system settings, and so on. In some embodiments, at step 1206, the new local user account is associated with the UUID. In other embodiments, the new local user account is associated with the UUID as part of step 1204 at the time of creation. In some embodiments, as part of the new user account creation, the user credentials associated with the UUID are automatically stored at the OS credential database 360 and the encrypted credential database 362 by the authentication gateway module 354.

At step 1208, the new local user account is advantageously associated with the groups determined at step 1202. As a result of this automatic association, the new local user account will be created with appropriate permissions and privileges without requiring additional user or administrator input. For example, if the user group associated with the UUID was "student", the new local user account may be created such that the user is not authorized to add or remove programs or access particular partitions of a disk drive of the user device 226a. Additionally, during subsequent configuration steps performed by the device agent 350, the device agent 350 will be able to advantageously set, update, or remediate system settings for the new local user account in accordance with the user group associated with the new local user account.

FIG. 13 provides details of step 912 of FIG. 9, in which a local user account is migrated at the user device 226a, in accordance with some embodiments. The particular steps, order of steps, and combination of steps are shown for illustrative and explanatory purposes only. Other embodiments can implement different particular steps, orders of steps, and combinations of steps to achieve similar functions or results.

At step 1302, an existing local user account is associated with the UUID. Association of the existing local user account with the UUID may be performed using the authentication gateway module 354, the system configuration modules 352, the OS authentication module 370, the device agent modules 356, and/or the other modules 374 of the user device 226a. In general, associating an existing local user account at the user device 226a with the UUID involves updating data objects of the user device's operating system such that an existing logical construct on the user device 226a that was associated with a different UUID is associated with the UUID received at step 804.

At step 1304, the authentication gateway module 354 determines, from the identity provider service 130, any user groups associated with the user UUID received at step 804 of FIG. 8. Details of step 1304 are the same as those described above with reference to step 1202. Then, at step 1306, the migrated local user account is advantageously associated with the groups determined at step 1304. As a result of this automatic association, the migrated local user account will have been updated such that it has appropriate permissions and privileges without requiring additional user or admin input. In some embodiments, as part of the automatic association, user credentials stored at the OS credential database 360 and/or the encrypted credential database 362 that were previously associated with the existing local user account are advantageously automatically replaced, by the authentication gateway module 354, with the user credentials associated with the UUID. Additionally, during subsequent configuration steps performed by the device agent 350, the device agent 350 will be able to advantageously set, update, or remediate system settings for the migrated local user account in accordance with the user group associated with the migrated local user account.

FIG. 14 illustrates an example compute node 1400 which could be used as a hardware platform for implementing all or a portion of each of the management platform 110, the administrator device 224, the user devices 226a-n, and/or the identity provider service 130, in accordance with some embodiments. The compute node 1400 generally includes one or more CPUs 1402, a memory module 1404 (e.g., RAM), a non-volatile data storage module 1406 (e.g., a hard-drive/disk-drive or array of hard-drives/disk-drives), a network I/O module 1408 (e.g., a network interface card (NIC) and/or a top-of-rack interface), and other modules 1410 such as user I/O, wireless communication modules, optical communication modules, system diagnostic or monitoring modules, or other modules. The CPUs 1402 are operable to perform processes in association with the memory module 1404 and the non-volatile data storage module 1406. In some embodiments, one or more compute nodes 1400 are configured to perform all or a portion of the processes 600 and 700 disclosed herein. In such embodiments, the memory module 1404 and the non-volatile data storage module 1406 may include all, or a portion of the programs and data required by the CPUs 1402 to perform the processes 600 and 700 disclosed herein.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method, comprising:
receiving user credentials by an authentication gateway module of a device agent operating at a user device;
transmitting, by the authentication gateway module, the user credentials to a remote identity provider service;
upon receiving, by the authentication gateway module, a first authentication response from the remote identity provider service indicating that the user credentials are authenticated by the remote identity provider service, transmitting, by the authentication gateway module, the user credentials to an operating system authentication module at the user device; and
upon receiving, by the authentication gateway module, a first authentication response from the operating system authentication module indicating that the user credentials are not authenticated by the operating system authentication module:
retrieving, by the authentication gateway module, first previously-stored user credentials from an encrypted credential database stored at the user device;
storing, by the authentication gateway module using the first previously-stored user credentials, the user credentials at an operating system credential database stored at the user device; and
re-transmitting, by the authentication gateway module, the user credentials to the operating system authentication module to authenticate a user at the user device.

2. The method of claim 1, wherein:
the encrypted credential database stored at the user device is configured to exclusively communicate with modules of the device agent.

3. The method of claim 1, further comprising:
upon receiving, by the authentication gateway module, a second authentication response from the operating system authentication module indicating that the user credentials are authenticated by the operating system authentication module:
storing, by the authentication gateway module, the user credentials at the encrypted credential database.

4. The method of claim 1, further comprising:
during a first time period corresponding to a first scheduled interval, sending a first request from the device agent to a remote management platform for first authentication module configuration data that is assigned to the user device during the first time period;
receiving, by the device agent from the remote management platform, the first authentication module configuration data; and
upon receiving, by the device agent, the first authentication module configuration data, configuring the authentication gateway module using the first authentication module configuration data;
wherein configuring the authentication gateway module enables the authentication gateway module.

5. The method of claim 4, further comprising:
during a second time period corresponding to a second scheduled interval, sending a second request from the device agent to the remote management platform for second authentication module configuration data that is assigned to the user device during the second time period;
determining, by the device agent, that the second authentication module configuration data was not received from the remote management platform;
determining, by the device agent, that the authentication gateway module was previously configured; and
upon determining, by the device agent, that the authentication gateway module was previously configured, de-configuring the authentication gateway module;
wherein de-configuring the authentication gateway module disables the authentication gateway module.

6. The method of claim 4, wherein:
the first authentication module configuration data includes a graphical user interface asset to be displayed by a graphical user interface of the user device.

7. The method of claim 1, further comprising:
receiving from the remote identity provider service, by the authentication gateway module, a user identifier associated with the user credentials; and
upon determining, by the authentication gateway module, that the user identifier is not associated with a local user account on the user device:
associating, by the authentication gateway module, an existing local user account on the user device with the user credentials; and
replacing, by the authentication gateway module, previously-stored credentials associated with the existing local user account stored at the operating system credential database with the user credentials.

8. The method of claim 7, further comprising:
receiving from the remote identity provider service, by the authentication gateway module, a user group identifier associated with the user credentials; and
associating, by the authentication gateway module, the existing local user account on the user device with the user group identifier.

9. The method of claim 1, further comprising:
receiving from the remote identity provider service, by the authentication gateway module, a user identifier associated with the user credentials; and
upon determining, by the authentication gateway module, that the user identifier is not associated with a local user account on the user device:
  creating, by the authentication gateway module, a new local user account on the user device with the user credentials; and
  storing, by the authentication gateway module, the user credentials at the operating system credential database in association with the new local user account.

10. The method of claim 9, further comprising:
receiving from the remote identity provider service, by the authentication gateway module, a user group identifier associated with the user credentials; and
associating, by the authentication gateway module, the new local user account on the user device with the user group identifier.

11. The method of claim 1, further comprising:
receiving, by the authentication gateway module from the remote identity provider service, a first authentication token, the first authentication token comprising an indication of a first token expiration time;
during a time period corresponding to a scheduled interval, determining, by the authentication gateway module, if the first token expiration time has elapsed; and
upon determining, by the authentication gateway module, that the first token expiration time has elapsed:
  retrieving, by the authentication gateway module, second previously-stored user credentials from the encrypted credential database; and
  requesting, by the authentication gateway module, a second token from the remote identity provider service using the second previously-stored user credentials, the second token having a second token expiration time.

12. The method of claim 11, further comprising:
upon receiving, by the authentication gateway module, a second authentication response from the remote identity provider service indicating that the second previously-stored user credentials are not authenticated by the remote identity provider service:
  receiving, by the authentication gateway module, updated user credentials; and
  requesting, by the authentication gateway module, the second token from the remote identity provider service using the updated user credentials.

13. A system, comprising:
a user device configured to receive user credentials at an authentication gateway module of a device agent operating at the user device and to transmit, by the authentication gateway module, the user credentials to a remote identity provider service;
wherein upon receiving, by the authentication gateway module, a first authentication response from the remote identity provider service indicating that the user credentials are authenticated by the remote identity provider service, the authentication gateway module is configured to transmit the user credentials to an operating system authentication module at the user device; and
wherein upon receiving, by the authentication gateway module, a first authentication response from the operating system authentication module indicating that the user credentials are not authenticated by the operating system authentication module, the authentication gateway module is configured to:
  retrieve, by the authentication gateway module, first previously-stored user credentials from an encrypted credential database stored at the user device;
  store, by the authentication gateway module using the first previously-stored user credentials, the user credentials at an operating system credential database stored at the user device; and
  re-transmit, by the authentication gateway module, the user credentials to the operating system authentication module to authenticate a user at the user device.

14. The system of claim 13, wherein:
the encrypted credential database stored at the user device is configured to exclusively communicate with modules of the device agent.

15. The system of claim 13, wherein the device agent is further configured to:
send a first request to a remote management platform for first authentication module configuration data that is assigned to the user device during a first time period corresponding to a first scheduled interval;
receive the first authentication module configuration data from the remote management platform; and
configure the authentication gateway module using the first authentication module configuration data upon receiving the first authentication module configuration data;
wherein configuring the authentication gateway module enables the authentication gateway module.

16. The system of claim 15, wherein the device agent is further configured to:
send a second request to the remote management platform for second authentication module configuration data that is assigned to the user device during a second time period corresponding to a second scheduled interval;
determine that the second authentication module configuration data was not received from the remote management platform;
determine that the authentication gateway module was previously configured; and
de-configure the authentication gateway module upon determining that the authentication gateway module was previously configured;
wherein de-configuring the authentication gateway module disables the authentication gateway module.

17. The system of claim 13, wherein the authentication gateway module is further configured to:
receive a first authentication token from the remote identity provider service, the first authentication token comprising an indication of a first token expiration time;
during a time period corresponding to a scheduled interval, determine if the first token expiration time has elapsed; and
upon determining, by the authentication gateway module, that the first token expiration time has elapsed:

retrieve second previously-stored user credentials from the encrypted credential database; and request a second token from the remote identity provider service using the second previously-stored user credentials, the second token having a second token expiration time.

18. The system of claim 17, wherein the authentication gateway module is further configured to:

upon receiving, by the authentication gateway module, a second authentication response from the remote identity provider service indicating that the second previously-stored user credentials are not authenticated by the remote identity provider service:

receive updated user credentials; and request the second token from the remote identity provider service using the updated user credentials.

19. The system of claim 13, wherein the authentication gateway module is further configured to:

receive a user identifier associated with the user credentials from the remote identity provider service; and upon determining, by the authentication gateway module, that the user identifier is not associated with a local user account on the user device:

associate an existing local user account on the user device with the user credentials; and replace previously-stored credentials associated with the existing local user account stored at the operating system credential database with the user credentials.

20. The system of claim 13, wherein the authentication gateway module is further configured to:

receive a user identifier associated with the user credentials from the remote identity provider service; and upon determining, by the authentication gateway module, that the user identifier is not associated with a local user account on the user device:

create a new local user account on the user device with the user credentials; and store the user credentials at the operating system credential database in association with the new local user account.

\* \* \* \* \*